US008229834B2

(12) United States Patent
Borkovec et al.

(10) Patent No.: US 8,229,834 B2
(45) Date of Patent: Jul. 24, 2012

(54) SYSTEM, METHOD AND PROGRAM FOR AGENCY COST ESTIMATION

(75) Inventors: Milan Borkovec, Boston, MA (US); Ananth Madhavan, New York, NY (US); Hans Heidle, New York, NY (US)

(73) Assignee: ITG Software Solutions, Inc., Culver City, CA (US)

( * ) Notice: Subject to any disclaimer, the term of this patent is extended or adjusted under 35 U.S.C. 154(b) by 1053 days.

(21) Appl. No.: 12/133,936

(22) Filed: Jun. 5, 2008

(65) Prior Publication Data

US 2009/0125448 A1 May 14, 2009

Related U.S. Application Data

(63) Continuation-in-part of application No. 10/166,719, filed on Jun. 12, 2002, now Pat. No. 7,974,906.

(60) Provisional application No. 60/924,904, filed on Jun. 5, 2007, provisional application No. 60/929,929, filed on Jul. 18, 2007.

(51) Int. Cl.
*G06Q 40/00* (2012.01)

(52) U.S. Cl. ............ 705/37; 705/35; 705/36 R; 705/400

(58) Field of Classification Search ........................ None
See application file for complete search history.

(56) References Cited

U.S. PATENT DOCUMENTS

| | | | | |
|---|---|---|---|---|
| 5,544,355 | A | 8/1996 | Chaudhuri et al. | |
| 6,112,189 | A | 8/2000 | Rickard et al. | |
| 6,349,291 | B1 | 2/2002 | Varma | |
| 6,564,191 | B1 * | 5/2003 | Reddy | 705/36 R |
| 7,606,751 | B2 * | 10/2009 | Tarbox et al. | 705/35 |
| 7,617,140 | B2 * | 11/2009 | Tarbox et al. | 705/35 |
| 2002/0174045 | A1 * | 11/2002 | Arena et al. | 705/36 |
| 2002/0194107 | A1 | 12/2002 | Li et al. | |
| 2003/0233306 | A1 | 12/2003 | Madhavan et al. | |
| 2004/0210543 | A1 * | 10/2004 | Ouimet | 705/400 |
| 2004/0215549 | A1 * | 10/2004 | Madhavan et al. | 705/37 |
| 2005/0102218 | A1 | 5/2005 | Sargent et al. | |
| 2006/0271469 | A1 * | 11/2006 | Rust | 705/37 |
| 2007/0088651 | A1 | 4/2007 | Burgess et al. | |

FOREIGN PATENT DOCUMENTS

| | | |
|---|---|---|
| JP | 2002269342 | 9/2002 |
| JP | 2003085359 | 3/2003 |
| WO | WO 02/37385 * | 5/2002 |

OTHER PUBLICATIONS

Bhuyan, Rafiqul et al. Trading on the Information Content of Open Interest: Evidence from the US Equity Options Market . Derivatives Use, Trading & Regulation. V11N1 pp. 16-36. Jun. 2005.*

* cited by examiner

*Primary Examiner* — Robert Niquette
(74) *Attorney, Agent, or Firm* — Rothwell, Figg, Ernst & Manbeck, P.C.

(57) ABSTRACT

A method, system and computer program product for forecasting the transaction cost of a portfolio trade execution that may be applied to any given trading strategy or an optimal trading strategy that minimizes transaction costs. The system accepts user-defined input variables from customers and generates a transaction cost estimation report based on those variables. Two models are utilized: discretionary and non-discretionary. A specific transaction cost estimation and optimization is performed that model the transaction costs of a specific trade execution based on the user's trading profile and market variables.

36 Claims, 34 Drawing Sheets

| | | ITG ACE Discretionary | | | ITG ACE Non-Discretionary | | |
|---|---|---|---|---|---|---|---|
| Order Size (in shares) | Risk Aversion | Optimal Trading Horizon (in days) | Expected Transaction Costs (per share) | Standard Deviation of Transaction Costs (per share) | Optimal Trading Horizon (in days) | Expected Transaction Costs (per share) | Standard Deviation of Transaction Costs (per share) |
| *Panel A. Values are in cents* | | | | | | | |
| 300,000 | 0.00 | 1 | 13.2 | 76.9 | 1 | 18.9 | 75.2 |
| 300,000 | 0.30 | 1 | 13.3 | 69.2 | 1 | 19.4 | 66.4 |
| 300,000 | 0.60 | 1 | 14.3 | 55.9 | 1 | 21.9 | 54.5 |
| 300,000 | 0.90 | 1 | 18.7 | 34.8 | 1 | 35.1 | 34.8 |
| 300,000 | 0.95 | 1 | 21.5 | 29.2 | 1 | 44.1 | 29.3 |
| 300,000 | 1.00 | 1 | 30.9 | 23.5 | 1 | 72.5 | 23.5 |
| 1,500,000 | 0.00 | 3 | 25.6 | 143.9 | 5 | 35.8 | 187.2 |
| 1,500,000 | 0.30 | 2 | 28.5 | 101.1 | 3 | 41.7 | 114.4 |
| 1,500,000 | 0.60 | 2 | 31.3 | 82.4 | 1 | 67.3 | 66.2 |
| 1,500,000 | 0.90 | 1 | 57.3 | 43.8 | 1 | 116.1 | 43.9 |
| 1,500,000 | 0.95 | 1 | 72.9 | 36.2 | 1 | 156.1 | 36.2 |
| 1,500,000 | 1.00 | 1 | 123.9 | 26.5 | 1 | 289.1 | 26.5 |
| *Panel B. Values are in basis points* | | | | | | | |
| 300,000 | 0.00 | 1 | 14.1 | 82.5 | 1 | 20.3 | 80.6 |
| 300,000 | 0.30 | 1 | 14.3 | 74.2 | 1 | 20.8 | 71.3 |
| 300,000 | 0.60 | 1 | 15.3 | 60.0 | 1 | 23.5 | 58.4 |
| 300,000 | 0.90 | 1 | 20.0 | 37.3 | 1 | 37.7 | 37.3 |
| 300,000 | 0.95 | 1 | 23.0 | 31.4 | 1 | 47.3 | 31.5 |
| 300,000 | 1.00 | 1 | 33.2 | 25.2 | 1 | 77.8 | 25.2 |
| 1,500,000 | 0.00 | 3 | 27.5 | 154.4 | 5 | 38.4 | 200.8 |
| 1,500,000 | 0.30 | 2 | 30.5 | 108.5 | 3 | 44.7 | 122.7 |
| 1,500,000 | 0.60 | 2 | 33.6 | 88.4 | 1 | 72.1 | 71.0 |
| 1,500,000 | 0.90 | 1 | 61.5 | 47.0 | 1 | 124.6 | 47.0 |
| 1,500,000 | 0.95 | 1 | 78.2 | 38.8 | 1 | 167.5 | 38.9 |
| 1,500,000 | 1.00 | 1 | 132.9 | 28.4 | 1 | 310.1 | 28.4 |

FIG.12

| Country Name | ISO Country Code | ITG ACE/1 available | ITG ACE/2 available |
|---|---|---|---|
| Australia | AUS | X | X |
| Austria | AUT | X | - |
| Belgium | BEL | X | X |
| Bermuda | BMU | X | - |
| Brazil | BRA | X | - |
| Canada | CAN | X | X |
| China | CHN | X | - |
| Czech Republic | CZE | X | - |
| Denmark | DNK | X | X |
| Finland | FIN | X | X |
| France | FRA | X | X |
| Germany | DEU | X | X |
| Greece | GRC | X | - |
| Hong Kong | HKG | X | X |
| Hungary | HUN | X | - |
| India | IND | X | - |
| Indonesia | IDN | X | - |
| Ireland | IRL | X | - |
| Israel | ISR | X | - |
| Italy | ITA | X | X |
| Japan | JPN | X | X |
| Korea | KOR | X | X |
| Luxemburg | LUX | X | - |
| Malaysia | MYS | X | - |
| Mexico | MEX | X | - |
| The Netherlands | NLD | X | X |
| New Zealand | NZL | X | - |
| Norway | NOR | X | X |
| Philippines | PHL | X | - |
| Poland | POL | X | - |
| Portugal | PRT | X | X |
| Russia | RUS | X | - |
| Singapore | SGP | X | X |
| South Africa | ZAF | X | - |
| Spain | ESP | X | X |
| Sweden | SWE | X | X |
| Switzerland | CHE | X | X |
| Taiwan | TWN | X | X |
| Thailand | THA | X | - |
| Turkey | TUR | X | - |
| United Kingdom (U.K.) | GBR | X | X |
| United States (U.S.) | USA | X | X |
| **Total number** | | **42** | **21** |

FIG.19

| Country Name | ISO Country Code | Number of Executions (in million) | Number of Clusters (Order Decisions) | Local Currency Volume (in billion) | Local Currency | Number of Stocks | Number of Clients |
|---|---|---|---|---|---|---|---|
| United States (U.S.) | USA | 42.300 | 4,592,255 | 6,402.0 | USD | 7,405 | 89 |
| United Kingdom (U.K.) | GBR | 2.110 | 290,093 | 415.0 | GBP | 1,871 | 45 |
| Japan | JPN | 1.530 | 201,130 | 419.0 | JPY | 1,794 | 48 |
| France | FRA | 0.800 | 127,390 | 233.9 | EUR | 477 | 49 |
| Germany | DEU | 0.570 | 98,279 | 176.9 | EUR | 377 | 49 |
| Switzerland | CHE | 0.470 | 69,302 | 210.3 | CHF | 223 | 48 |
| The Netherlands | NLD | 0.390 | 58,530 | 103.2 | EUR | 119 | 48 |
| Italy | ITA | 0.270 | 54,069 | 76.0 | EUR | 190 | 46 |
| Canada | CAN | 0.270 | 46,535 | 81.3 | CAD | 739 | 51 |
| Spain | ESP | 0.220 | 42,264 | 63.5 | EUR | 98 | 47 |
| Australia | AUS | 0.190 | 38,600 | 62.4 | AUD | 399 | 46 |
| Sweden | SWE | 0.200 | 27,415 | 444.7 | SEK | 168 | 46 |
| Finland | FIN | 0.110 | 19,980 | 30.1 | EUR | 76 | 40 |
| Norway | NOR | 0.068 | 13,435 | 156.1 | NOK | 124 | 42 |
| Belgium | BEL | 0.063 | 13,228 | 14.4 | EUR | 74 | 44 |
| Denmark | DNK | 0.051 | 9,007 | 96.0 | DKK | 80 | 45 |
| Portugal | PRT | 0.022 | 4,284 | 5.3 | EUR | 22 | 35 |

FIG.28

SYSTEM, METHOD AND PROGRAM FOR AGENCY COST ESTIMATION

REFERENCE TO RELATED APPLICATION

Pursuant to 35 U.S.C. §119(e), this application claims priority to U.S. Provisional Patent Application Ser. No. 60/924,904 filed on Jun. 5, 2007, and U.S. Provisional Patent Application Ser. No. 60/929,929 filed on Jul. 18, 2007, the entire contents of each application is incorporated herein by reference. This application is a continuation in part of and claims priority to pending U.S. patent application Ser. No. 10/166,719 filed on Jun. 12, 2002, the entire contents of which is incorporated herein by reference.

BACKGROUND OF THE INVENTION

1. Field of the Invention

This invention relates to systems, methods and computer program products managing executions costs. More particularly, the invention relates to systems, methods and computer program products for creating and implementing mathematical/econometric models that provide pre-trade estimates of the price impact costs of a given order to trade a number of shares of one or more tradable assets, such as securities, as well as optimization techniques utilizing the cost estimates.

2. Background of the Related Art

Investment performance reflects both the investment strategy of the portfolio manager and the execution costs incurred while implementing the objectives of the investment strategy. Execution costs can be large, especially when compared to gross returns, and thus can affect performance significantly. Managing execution costs can make or break the success of a particular investment strategy. For institutional traders who trade large volumes, implicit costs, most importantly the price impact of trading, typically represent a significant portion of total execution costs. See, for example, Domowitz, Glen, and Madhavan (2002) for various definitions of costs along with discussions and analyses.

The importance of accurately measuring execution costs has grown in recent years due to fragmented liquidity in today's equity markets, algorithmic trading, direct market access, and structural and regulatory changes such as decimalization (implemented in 2001) and Reg NMS (implemented in 2007). Moreover, the recent demand of some legislators and fund share holder advocates for better disclosure of commissions and other execution costs increases their importance even further (see, for example, Teitelbaum (2003)). This makes the management of execution costs an important issue for institutional investors whose trades are large relative to average daily volume.

Thus, there is a continued need for new and improved systems and methods for estimating transaction costs.

SUMMARY OF THE INVENTION

The present invention provides systems, methods and computer program products for forecasting the price impact costs of a trade execution that may be applied to any given trading strategy.

According to aspects of the present invention, an Agency Cost Estimator ("ACE®") system, method and computer program product is provided that includes: a first part that comprises computer-based models that allow a user to obtain price impact cost estimates for any pre-specified strategy, and a second part that comprises computer-executed mathematical models that generate an optimal trading strategy subject to certain assumptions about the user's ultimate objectives.

According to aspects of the present invention, the models include a discretionary model that is based on all trades, including opportunistic trades, and a non-discretionary model that is based only on non-opportunistic trades (i.e., is not based on data relating to opportunistic trades). As a result, a user of the system can utilize modeling that more accurately reflects one's own trading strategy.

According to aspects of the invention, systems, methods and computer program products are provided for building and complementing the discretionary and non-discretionary models.

The present invention will become more fully understood from the forthcoming detailed description of preferred embodiments read in conjunction with the accompanying drawings. Both the detailed description and the drawings are given by way of illustration only, and are not limitative of the present invention.

BRIEF DESCRIPTION OF THE DRAWINGS

FIG. 12 is a table illustrating the expected treading costs, standard deviation of trading costs, and trading horizons for different values of risk aversion.

FIG. 19 is a table reporting countries covered by ACE models.

FIG. 28 is a graph illustrating a comparison of estimated versus discretionary costs.

DETAILED DESCRIPTION OF THE PREFERRED EMBODIMENTS

Figure 1:
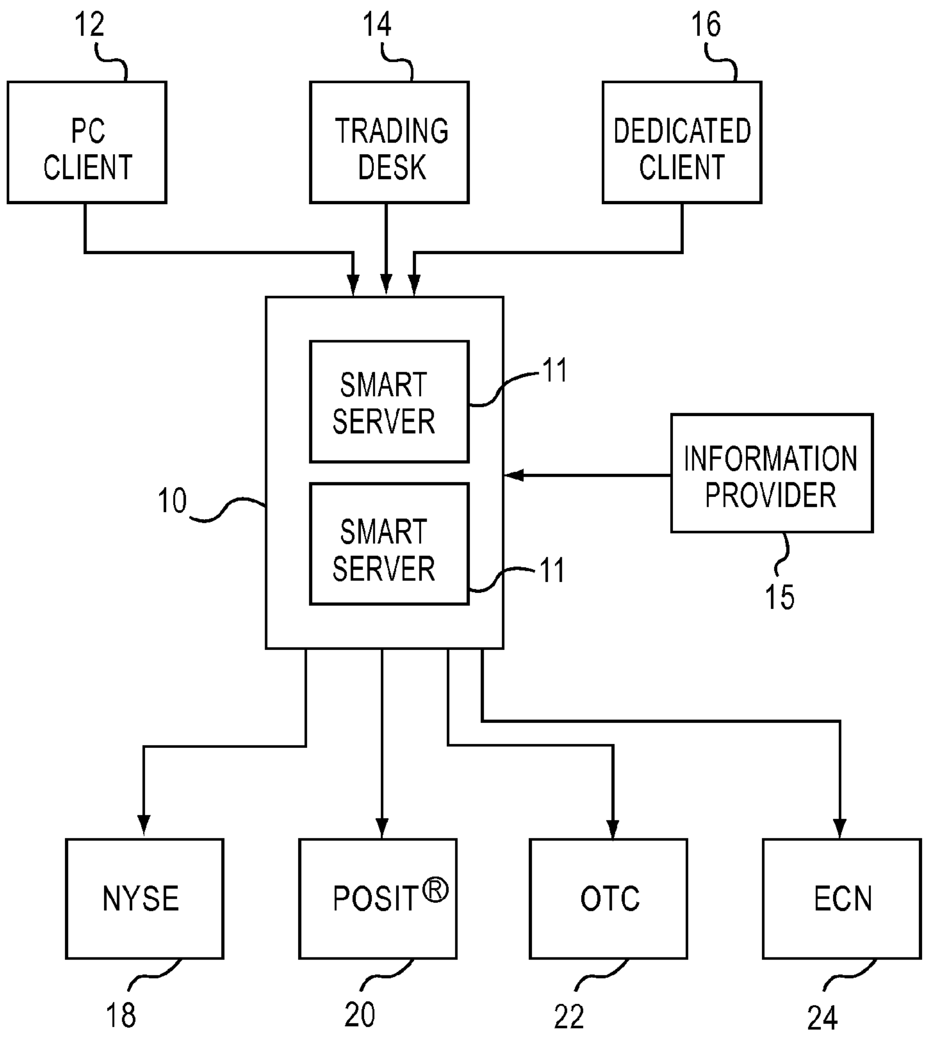
FIG. 1 is a block diagram of a system for forecasting transaction costs for a proposed trade execution according to a specific trading strategy and according to a preferred embodiment of the invention.

ITG INC., the assignee of the present invention, provides a variety of tools that help investors minimize their execution costs, and hence maximize their realized returns. The present invention is directed to features and aspects of ITG's ACE® (Agency Cost Estimator), which is a product that applies a mathematical/econometric model that provides a pre-trade estimate of the price impact costs of a given order. ACE® can measure execution costs using the implementation shortfall approach introduced by Perold (1988), which defines execution costs as the appropriately signed difference between the average execution price and the prevailing price at the start of the order execution. This measure includes both the bid-ask spread as well as the price impact costs of the order—the two most important cost components. Explicit cost components, such as commissions, can easily be added to the ACE® estimate to obtain total costs of trading. Components and features of ACE®, including the original ACE® model, upon which certain aspects of the present invention are based, are disclosed in U.S. patent application Ser. No. 10/166,719 filed on Jun. 12, 2002, the entire contents of which have already been incorporated herein by reference above.

The present invention can be used in conjunction with other pre-trade analytic tools in many ways, including:

- to provide accurate cost estimates (e.g., expected execution costs and standard deviation of execution costs of an order),
- to estimate statistical characteristics of the distribution of execution costs, including distribution percentiles and confidence intervals,
- to form pre-trade cost benchmarks to evaluate the execution performance of traders and brokers for a variety of common pre-specified strategies (in particular, Volume Weighted Average Price (VWAP)-strategy—constant fraction of average daily volume, uniform strategy, ACE® Optimal Strategy) or any arbitrary user-specified strategy,
- to analyze how the costs of trading depend on the trading strategy,
- to fine-tune a trading strategy in terms of trading horizon, aggressiveness, and other parameters, and
- to recommend an optimal trading strategy that balances execution costs against the uncertainty in the realized costs of trading (opportunity costs).

In addition, ACE® can be used as post-trade cost benchmark for trading performance.

Unlike many other conventional products, ACE® includes a dynamic model that recognizes that a trader or automated system will typically need to break up a large order into several smaller trades to minimize price impact costs. There are three critical features of ACE® that merit special attention:

1. ACE® recognizes that traders incur price impact costs because a trade moves the price adversely in the market when it is executed. It is the cost of demanding liquidity. Price impact has both a permanent and a temporary component. The permanent component is information-based: it captures the persistent price change as a result of the information the occurrence of a trade conveys to the market. The temporary price impact is transitory in nature: it is the additional price concession necessary to get the liquidity provider to take the other side of the order. The permanent price impact implies that the first trade of a multi-trade order will affect the prices of all subsequent sub-blocks sent to the market. Modeling this dynamic link is a key element of computing the price impact for a sequence of trades spread over time.
2. ACE® recognizes that there is no such thing as "the" cost estimate of a trade. In reality, trading costs are a function of the trader's strategy or execution approach. The more aggressive the trading strategy, the higher the costs are. Trading aggressiveness can be measured in terms of how rapidly the trader wants to execute the trade given the trade's size relative to normal volume. Thus, the ACE® estimate is based on a particular trading strategy.
3. ACE® can also be used to find an "optimal strategy" that balances price impact costs against opportunity costs. Such an ACE® optimal strategy represents a solution of a very general optimization problem (with time-varying parameters) for both the single name and the portfolio case. Opportunity costs are largely due to price volatility, which creates uncertainty in the realized costs of trading as it does for the realized returns of investing. When executing an agency order, the balance between price impact and opportunity costs is chosen on the basis of the motivation for the order, which is ultimately given by the investment manager. Passive managers are mainly concerned about price impact while growth or momentum managers are more worried about opportunity costs. Reference is made to the investment manager's sensitivity to opportunity costs as weight on risk, or risk aversion, just as is done for an investment manager's sensitivity to investment risk. ACE® estimates the expected costs and the standard deviation of the costs of the agency trading strategy that optimally balances the trade-off between paying price impact costs and incurring opportunity costs for a given level of risk aversion and trading horizon. The trading horizon can either be chosen by the user or ACE® can determine an optimal time horizon for a given order. In ACE®, the user can define the weight on risk. To allow for this, ACE® formulates the trading problem as a multi-period stochastic control problem. The solution to this stochastic control problem is the optimal strategy that minimizes the weighted sum of price impact and opportunity costs. ACE® provides the expected costs and standard deviation of the costs for the resulting optimal strategy. This strategy is recommended for traders who want to weigh the opportunity costs associated with trading over a long interval of time consistent with their weight on risk.

The ACE® model is not a purely econometric model calibrated based on transaction cost data. Rather, it is a structural model that uses parameters estimated econometrically. In particular, ACE® relies on stock-specific econometric models of volatility, price impact, and price improvement, as well as a risk model. In addition, a purely econometric model based on empirical data would not allow one to provide cost estimates for large orders, since there simply are not many observations for large orders (diBartolomeo (2006)). By employing a structural model, ACE® does mitigate this problem.

The ACE® framework of the present invention builds on the system and methods introduced in U.S. patent application Ser. No. 10/166,719 filed on June 12, 2002.

Referring to FIG. 1, one or more transaction cost optimization servers 11 can be provided on a communication network 10. The network 10 may be a public network or a private dedicated network. A server 11 can be programmed with transaction cost estimation and optimization computer program products, and has access to various trading mechanisms or exchanges through the network 10, such as the New York Stock Exchange (NYSE) 18, the POSIT® intra-day equity matching system 20, the over-the-counter (OTC) market 22 (including, but not limited to, the NASDAQ stock market), or an electronic communications network (ECN) 24.

According to preferred embodiments of the present invention, the server 11 is configured to be electronically accessible directly by customers through the network 10. This access can be either through a personal computer (PC) 12 or a dedicated client terminal 16 which is electronically connected to the network 10 such as via the Internet or a dedicated line. Alternatively, clients could interact with the network via a trading desk 14 through which a customer can perform a transaction cost analysis. Particularly, the trading desk is a user interface that provides comprehensive agency trading services utilizing multiple liquidity sources.

According to preferred embodiments of the present invention, a number of different servers 11 may be provided on the network, with each server 11 running a transaction cost analysis program and having access to various appropriate trading forums and various electronic communication networks. A customer may submit a proposed portfolio trade execution for analysis with any specific one of the servers 11. A server 11 receives the proposed portfolio trade execution from the customer over the network 10 and processes and analyzes the execution according to the user-selected preset trading strategy algorithm being run by the server 11. The server 11 then executes the transaction cost analysis and optimization and preferably transmits the execution results to the customer in real time.

By providing such servers, a significant advantage over the prior art system (where analyses are executed manually by human traders or by computer using outdated information) is achieved. The server 11 can handle much more complex trades including trades involving large volumes and many more different equities. Additionally, the server 11 can provide expert results for a very large number of equities, unlike a trader who may be able to concentrate on or follow only a relatively small number of equities at once. A server according to the present invention has a further advantage over a human trader in that it can be electronically connected via the network 10 to a real time market information provider 15 as well as sources providing historical and derived market data such that it can receive and process multiple indicators on a continuous basis. Further, multiple requests for transaction cost analysis having different desired trading strategies (e.g., levels of risk aversion) can be simultaneously executed by routing proposed portfolio trade orders to the appropriate server 11.

Figure 2:
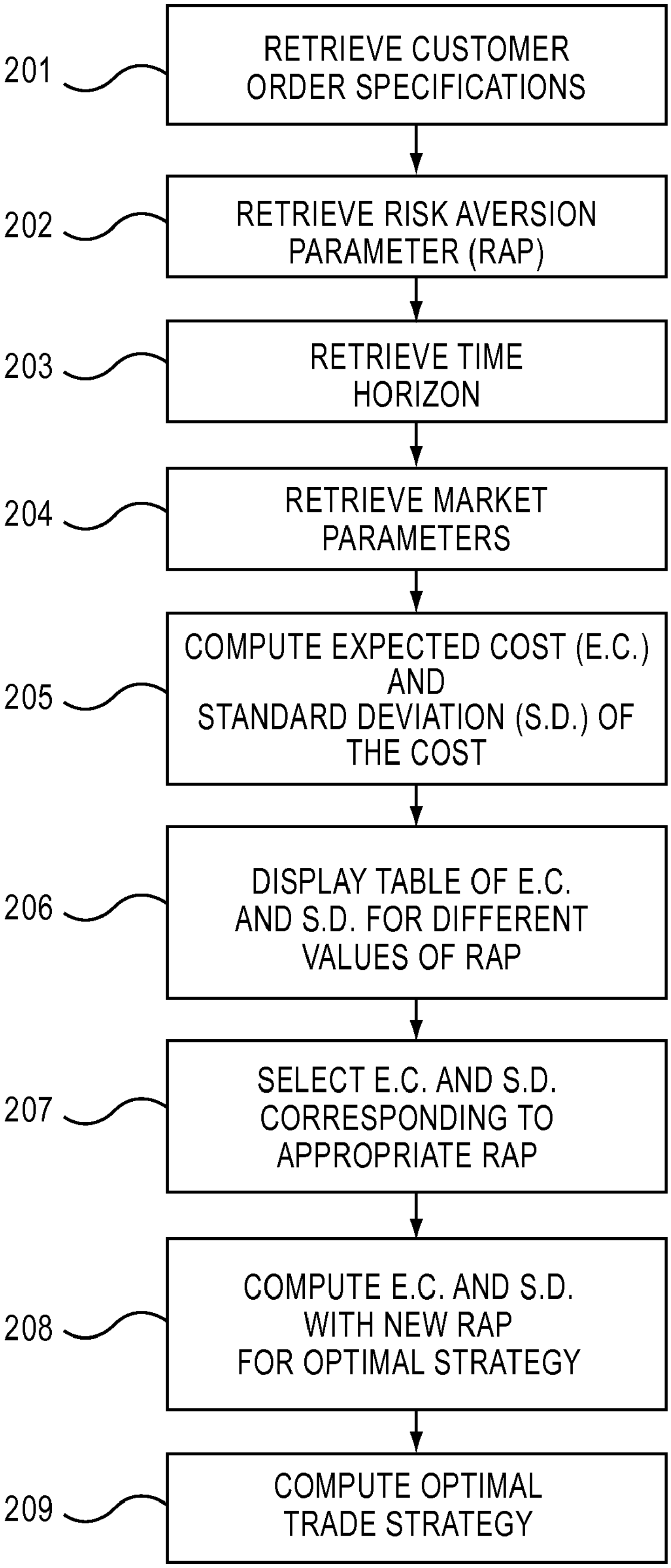
FIG. 2 is a flow diagram of an exemplary system for estimating and optimizing the transaction costs of a trade execution carried out under a specific trading strategy according to the invention.

FIG. 2 illustrates one example of a system for estimating and optimizing the transaction costs of a trade execution according to the invention, wherein transaction costs are estimated according to a transaction cost estimation and optimization algorithms and models. Customers wishing to execute the ACE® transaction cost estimation and optimization for proposed portfolio trades input requests for analyses and transmit them directly to the ACE® server. The ACE® server performs one or more transaction cost analyses (TCA).

According to this method, at step 201 the customer's order specifications are retrieved. For example, a customer may wish to sell 1 million shares of security XYZ. At step 202, the customer specifies (and inputs) a value for the risk aversion parameter (RAP). If no value is retrieved, the program sets the default value, which is preferably 0.3. At step 203, the customer specifies the optimal trading time horizon, e.g., selling 1 million shares of XYZ security over 7 days. At step 204, the program retrieves market parameters, e.g., security master information (i.e., ticker symbol, cusip, exchange) closing price, volatility, and trading volume. At step 205, estimations are calculated for the customer's set of parameters and system inputs based on the most recent market data. At step 206, the results are displayed to the customer as a table of expected costs and standard deviation of costs for different RAP values. At step 207, the customer selects a pair of values (expected cost and standard deviation) from the table that are most appropriate in the particular case, and a value of RAP corresponding to the chosen pair of values. At step 208, the customer inputs the new RAP value (while maintaining the other parameters) to see a new set of expected cost and cost standard deviation. This establishes a range of cost estimates. At step 209, optimal trade strategies are calculated and displayed for a customer's inputted parameters, from which the customer may choose the strategy that best fits the customer's particular situation.

As can be seen from FIG. 2, the ACE® method and system can include a computer-executed set of statistical models that forecasts the transaction costs of a trade execution. In ACE®, costs are measured as the difference between the average execution price and the prevailing price at the start of order execution.

An important aspect of ACE® is that it can be used to recommend a particular trading strategy for a user. ACE® balances two considerations: expected cost and standard deviation. The ACE® model can estimate the expected cost ("E(C)") and the standard deviation ("SD(C)") of the cost of the agency trading strategy that optimally balances the trade-off between paying price impact (in consideration for liquidity demand) and incurring opportunity costs for a user-specified weights on cost and risk, and trading horizon. It does so by expressing the trading problem as a multi-period stochastic control problem. It then calculates the expected cost and the standard deviation of the cost for the resulting optimal strategy.

The execution cost is a signed (i.e., positive or negative) difference between the value of a security or portfolio of securities at the beginning and the end of the specified trading horizon. ACE® can estimate the expected cost of the agency trading strategy as follows:

In an exemplary method, the trading horizon is first divided into a number of bins, or time periods of equal duration. For example, in the U.S. market, ACE® preferably considers thirteen bins of 30 minute duration per trading day. However, any number of bins of any duration may be used so long as the bin parameters are appropriately configured for the chosen duration. The trading horizon may consist of several trading days, with an arbitrary starting bin in the first day and ending bin in the last day. The trade order is defined by its trading horizon, trade side (buy or sell), size and trading strategy (sequence of share quantities per bin for a given trading horizon). Trading of all share quantities specified for each bin is assumed to be completed within the respective bin.

Price improvement is a price received that is better than the prevailing prices (i.e., bid for a sell order or ask for a buy order). Generally, all buyer/seller initiated orders are expected to execute at the prevailing ask/bid quote price. However, a buyer/seller often may receive a better execution price than the prevailing ask/bid quote price at the time the order was placed, due to sudden and unpredictable market moves. Such better received price is defined as a price improvement.

For any given security, volume and price volatility vary significantly by bin within the same trading day. The volume and volatility distributions by bin are determined statistically and taken into account when estimating transaction costs and generating an optimal strategy. While volume and volatility distributions for a particular stock ideally should be used when estimating transactions costs for that stock, research has demonstrated that such distributions may be unstable, even for very liquid stocks, because of market noise. Consequently, as an alternative aggregated bin distributions of a larger number of stocks may be used. Such aggregated distributions have been shown to be much more stable.

The total realized transaction costs C can be defined as:

$$C = \sum_{i=1}^{T} [C_i(n_i) + (\alpha + \epsilon_i\sigma + T_i n_i)x_i] \tag{1}$$

where ni=total number of shares traded on day i ci=cost on day 1 for trading ni shares α=expected daily price change ϵi=random price disturbance for day i σ=standard deviation of daily price change Ti=linear coefficient for price impact persistence after trade on day i xi=residual at the end of day i.

The mean or expected cost EC may be considered as simply an average value of total cost if the execution could be repeated many times, since the total execution cost C is a stochastic or random variable rather than a deterministic value or number. This is so because total execution cost is subject to a large number of unknown factors, including uncertain behavior of other market participants, market movements related to macroeconomic or stock-specific factors, etc. EC may be defined as $$EC = \sum_{i=1}^{T} [EC_i(n_i) + (\alpha x_i + T_i n_i x_i)], \tag{2}$$

where $$EC_i(n_i) = \sum_{j=1}^{N} [c_j \cdot n_{i,j}^2 + (\alpha_j + \gamma_j n_{i,j})\tilde{x}_{i,j}] + (\alpha_0 + J)n_i, \tag{3}$$

cj=linear coefficient for temporary price impact for bin j

αj=standard deviation of price change in bin j

α0=standard deviation of price change between closing and opening

γj=linear coefficient for price impact persistence after trade in bin j ni,j=shares traded in bin j of day i J=half bid-ask spread

~ xi,j=residual for the day after bin j of day i

N=number of bins in trading horizon.

In the first use, computing a cost of a pre-specified trading strategy, equations (2) and (3) are used to generate a predicted cost. Specifically, given a pre-specified distribution of shares across the trading horizon, by bin, given by {n}, the expected price in each bin is computed using e.g., (3) and then sum across bins (weighting by ni) using e.g., (2) to get total cost. A proprietary daily risk model is used to get a forward looking estimate of the variance of cost, allowing for the possibility of price movements across bins.

In the second use of ACE®, the optimal trading strategy, denoted by {n*}, is computed by solving a particular optimization problem that balances expected cost against variance of cost. The optimization problem of ACE® is then given as:

$$PD = \min\{(1-\lambda)EC + \lambda^* \text{Var } C\},$$

where λ is a non-negative parameter called the risk aversion parameter (or weight on opportunity cost), and Var C is the variance or square of the standard deviation of cost C. The weight on opportunity cost is typically input by the user and is a number between 0 and 1; very low weights correspond to styles of trading where opportunity costs are not a significant consideration (e.g., a value trader without information), whereas high values correspond to aggressive trading styles (e.g., a trader who is concerned about adverse price movements) where trading is accomplished rapidly.

According to the present invention, ACE® can reliably forecast transaction costs and estimate their statistical characteristics for any scenario selected by a user. ACE® estimates depend on the user's strategy and the underlying price impact model parameters. The user's strategy is reflected in trading style and aggressiveness. The price impact model parameters can be calibrated using proprietary ITG PEER GROUP data in order to be in line with "typical" costs of large institutions. The trading style can be characterized by the aggressiveness (participation rate) and the level of opportunistic trading.

Further examples and details regarding aspects of the base ACE® system, method and computer program product are disclosed in U.S. patent application Ser. No. 10/166,719 filed on Jun. 12, 2002.

The inventors have discovered that realized costs for opportunistic traders do not match with the realized costs of traders that have to execute most of the times (i.e., non-opportunistic or non-discretionary traders). In order to better account for this discrepancy, the present invention improves upon the original ACE® invention by providing two cost estimates: one called ACE® Discretionary and another one called ACE® Non-Discretionary.

As the names indicate, for ACE® Discretionary, all executions are used for the building (also called calibration) of the ACE® model, i.e., even orders for which the traders can postpone or abandon trading to take advantage of market conditions. For ACE® Non-Discretionary, opportunistic executions are excluded from the building of the model and only execution data are included for orders that traders do not have much discretion and must execute regardless of whether market conditions are favorable.

ACE® can be implemented for equities or for non-equity asset classes.

The ACE® model can be estimated for each exchange of each country separately. This approach is necessary since transaction costs vary significantly between different countries and exchanges (see, for example, Munck (2006)).

ACE® can distinguish between the market price, defined as a stock mid-quote price, and the average execution price, at which a given bin's shares are executed. The average execution price differs from the market price since it includes temporary price impact costs and average price improvement. For small orders this difference is typically only half of the prevailing bid-ask spread, net of any price improvement. Price improvement is defined as receiving a price better than the prevailing prices (bid for a sell or ask for a buy) at the time the order was placed. For larger orders that exceed the bid/ask size, the execution price reflects both permanent and temporary price impacts. Permanent price impact captures the information content of the order, while the temporary price impact is the cost of demanding liquidity. Trade execution affects not only the trade price, but the market price as well. Large size trades move the market price not only within the execution period, but have a persistent effect on the market price to the end of the trading day. Such an effect is usually called a permanent price impact. The market price is also affected by other factors that are captured in a stochastic disturbance term. Of course, both the temporary price impact and the permanent price impact increase with the number of shares traded within a bin.

Execution costs can be considered the appropriately signed difference between the market price of the stock at the beginning of the trading horizon and the average execution price for the order. Since there are both deterministic and random factors involved in the dynamic analysis, execution costs are stochastic in nature and should be analyzed by statistical methods. Further, given the multi-period nature of the optimization control problem, the analysis also requires the use of stochastic dynamic programming.

Figure 3:
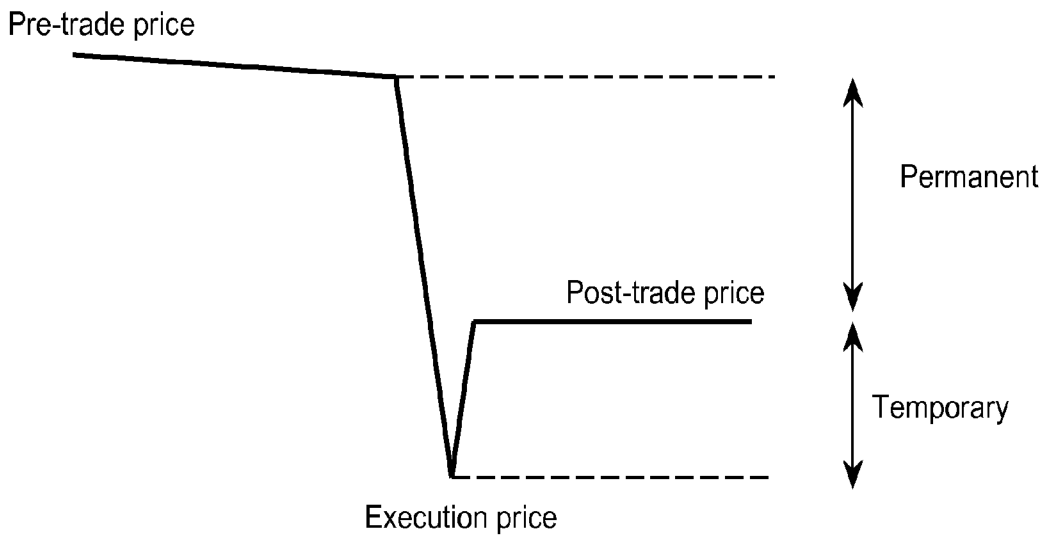
FIG. 3 is a graph illustrating a price impact model.

FIG. 3 provides an illustration to the above-described concepts and terms. The temporary and permanent price impact applies to both single and multiple executions. FIG. 3 illustrates the concept behind the ACE® price impact model for a sell trade. The execution price of the stock is lower than the pre-trade price as the law of supply and demand suggests. The larger the size of the trade, the more likely the sale price will be lower. The difference between pre-trade market price and execution price consists of two parts—permanent and temporary price impact. While the temporary price impact only affects the price of the trade itself, the permanent price impact has a persistent effect on the market price.

Providing reliable estimates of the model's parameters presents a special challenge, and indeed is the most difficult aspect of creating and maintaining the ACE® model. Stock market dynamics are complex and are subject to a variety of institutional features. For example, price impact is extremely difficult to measure given the low signal-to-noise ratio induced by intraday price volatility, and very comprehensive statistical techniques to extract the "useful" signal are needed. In short, the econometric implementation of ACE® is the most critical element of the model development.

All ACE® implementations preferably use stock-specific parameters estimated from the most recent market data, including security master information (ticker, cusip/sedol, exchange), the previous trading day's closing price, and estimates for volatility, average trading volume, and bid-ask spread of each security.

The volatility is preferably the historical 60-day price volatility where the daily returns are adjusted by the VIX level. VIX is the ticker symbol for the Chicago Board Options Exchange Volatility Index, which is a measure of the implied volatility of S&P 500 index options. It represents one measure of the market's expectation of volatility over the next 30-day period. Average trading volume is estimated as the median daily dollar volume for the 21 most recent trading days. The bid-ask spread is computed as the 5-day time-weighted average daily bid-ask spread. The estimation methodologies for average trading volume and bid-ask spread are selected to balance the latest trends in stock behavior against fluctuations generated by market news, earnings announcements, and other temporary factors. It is worthwhile noting that any other estimation approaches can be used as well, if so desired.

The ACE® framework is preferably built in such a way that the market price behavior of a stock may depend on its expected intraday stock returns. By default, these returns are set to zero, but client-specific "alpha" models may be included in the ACE® analysis.

Besides estimating transaction costs for single name trades, ACE® may also be used efficiently for pre- and post-trade analysis of portfolios. In all ACE® implementations, correlations between stock returns are preferably estimated using ITG Risk Models. Depending on the stock universe in the trade list, the corresponding country, region, or global ITG Risk Model is used.

The present invention takes into account that trading volume, price volatility, and bid-ask spreads vary significantly within the same trading day, change over the course of time, are stock-specific, are relatively stable for very liquid securities, and are not stable for illiquid securities.

Figure 4:
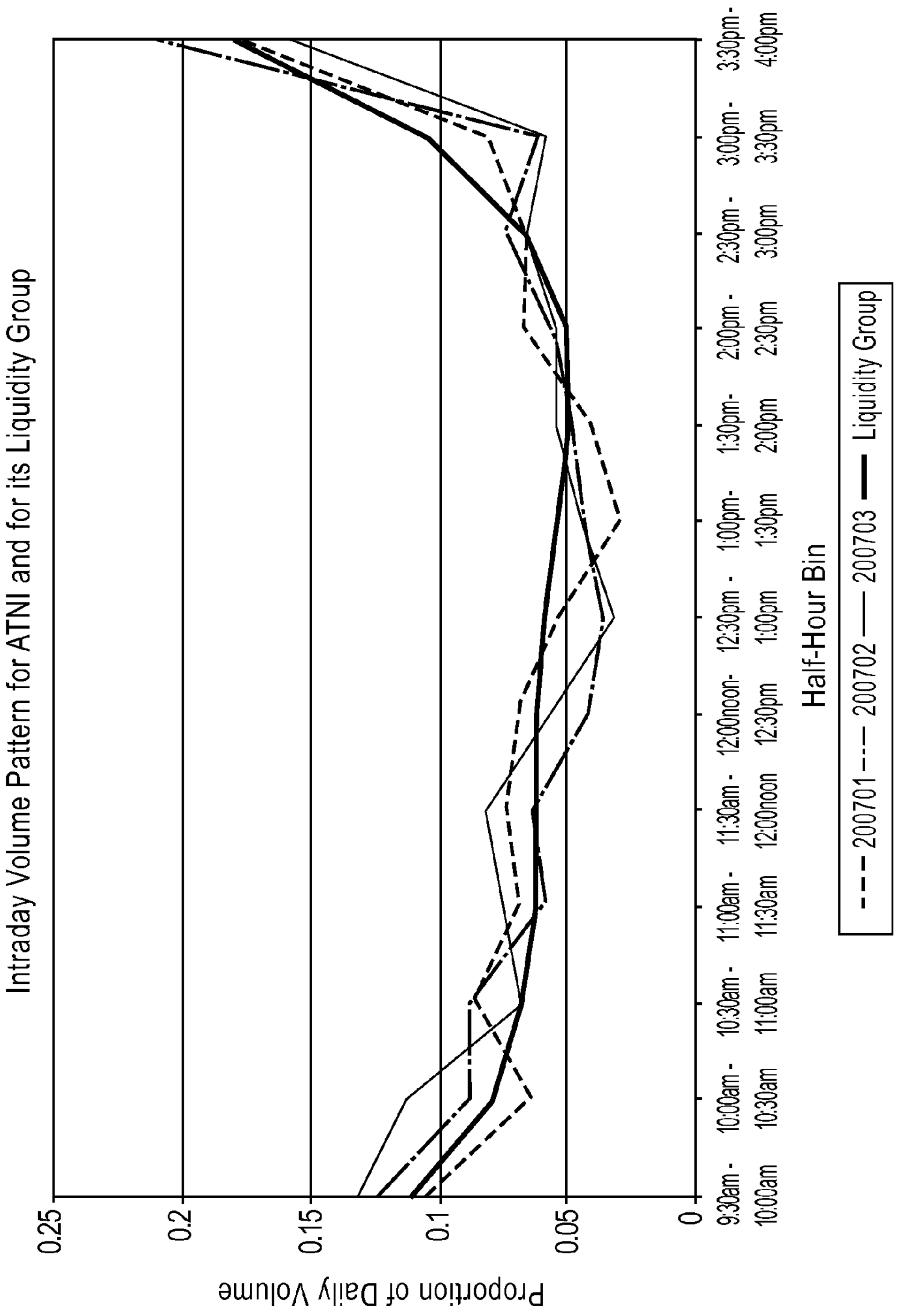
FIG. 4 is a graph illustrating intraday volume for a security and for its liquidity group.
Figure 5:
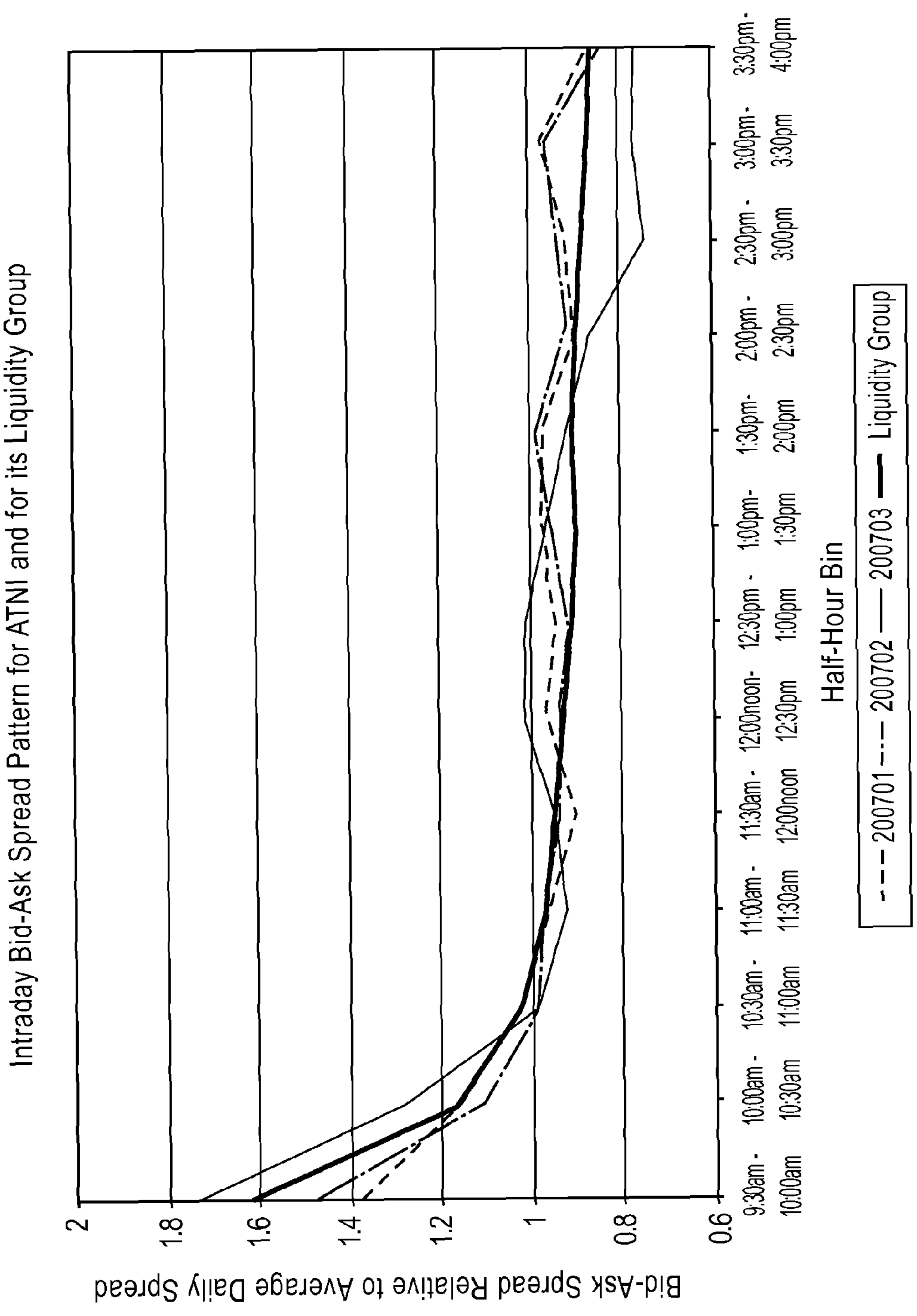
FIG. 5 is a graph illustrating intraday bid-ask spread for Atlanta Tele-Network Inc. and for its liquidity group.

The intraday variations in volume, volatility, and spreads can be measured statistically and incorporated within ACE's cost estimation. Ideally, if one intends to estimate costs for a stock, the intraday volume, volatility, and spread distributions for the particular stock should be used. The research, however, demonstrates that such distributions are unstable for less liquid stocks due to both market and stock-specific fluctuations. FIGS. 4 and 5 show intraday volume and spread distributions for Atlantic Tele-Network Inc. (ATNI) during several time periods. Atlantic Tele-Network Inc. has been selected for illustrative purposes at random. The stock belongs to the category of relatively illiquid stocks, its market capitalization is $394.2 million and the median daily share volume is 50,000 shares as of May 1, 2007.

FIG. 4 shows the intraday volume pattern for Atlanta Tele-Network Inc. (ATNI) for the months January, February, and March of 2007. The stock is a relatively illiquid stock, its market capitalization is $394.2 million, and the median daily share volume is about 50,000 shares as of May 1, 2007. The distributions show some fluctuations, especially at the beginning and at the end of the trading day. The bold line represents the smoothed average intraday volume distributions for all stocks which belong to the same market and liquidity group as ATNI. The average was taken over the three-month period from January to March, 2007.

FIG. 5 shows the intraday bid-ask spread pattern for Atlanta Tele-Network Inc. (ATNI) for the months January, February, and March of 2007. The stock is a relatively illiquid stocks, its market capitalization is $394.2 million and the median daily share volume is about 50,000 shares as of May 1, 2007. The distributions show some fluctuations, especially at the beginning and at the end of the trading day. The bold line represents the smoothed average intraday bid-ask spread distribution for all stocks which belong to the same market and liquidity group as ATNI. The average was taken over the three-month period from January to March, 2007.

Note, in the remainder of this document, if not specified otherwise, all ACE® numbers presented in tables and figures are based on the ACE® Non-Discretionary embodiment. Clearly, with such variation, for example, in the intraday volume or spread pattern for ATNI, one cannot be certain that using the latest available distribution calculated from, e.g., March data will be a good estimate for April. A possible alternative for less liquid stocks is to use aggregated distributions based on a significant number of stocks, for example, all stocks included in similar markets (NYSE/AMEX, Nasdaq) and liquidity groups. These distributions are much more stable as demonstrated by the bold lines in FIGS. 4 and 5, and they provide more robust forecasts. IT is assumed that distributions of trading volume, volatility, and spreads are, respectively, averages of trading volume, volatility, and spread distributions across individual stocks on an equally-weighted basis. All stocks included in this distribution are of equal importance. This makes sense, since the main purpose of the aggregation is to get meaningful and stable estimates for illiquid stocks. The same approach is applicable to international markets. Volume, volatility and spread distributions are updated monthly, based on the most recent available trade and quote data. Both stock-specific and aggregated distributions are smoothed to control for market noise.

In general, trading strategies can be subdivided into two categories: structured and opportunistic trading strategies.

Opportunistic trading strategies do not strictly follow a pre-specified trading schedule. Instead, these strategies are continuously searching for liquidity and opportunities for favorable execution based on real-time information. The success of such algorithms requires reliable quantitative forecasts of price movements and liquidity patterns, as well as intelligently combined use of trading venues and alternative order types (such as discretionary limit orders, Immediate-Or-Cancel (IOC) orders, or pegged orders). Opportunistic trading strategies work well for orders that do not have to be completed. However, they are not suitable for orders that need to be executed in full within a certain time horizon.

In contrast, structured, or more precisely scheduled, strategies are generally linked to a certain benchmark, for instance Volume Weighted Average Price (VWAP) or implementation shortfall, and are mostly based on historical data and their underlying analytics like the historical intra-day volume, volatility, and spread patterns. At the macro-level, these algorithmic trading strategies suggest how to optimally slice a large order in different time intervals within a specified horizon, but additional intelligent rules have to be used to execute each part of the original order, taking specifically into account

- how close one should follow the suggested trading schedule (order timing, deviation rule),
- order type selection (limit orders, market orders, discretionary orders, and IOC orders, etc.),
- trading venue selection (smart order routing to execute at the best available price and to discover undisclosed liquidity).

Most of the rules require the input of real-time information and depend on models/algorithms that can be used to search for the best price with the fewest time constraints. For more information about strategy classifications and selections given the specific objectives and scenarios, see for example, Domowitz and Yegerman (2005) or Yang and Jiu (2006).

ACE® uses trading strategies that belong to the class of structured strategies. In ACE®, a strategy is defined as a sequence of number of shares that should be executed within an execution period according to a bin scheme. A bin is a 30-minute period during a trading day. For example, in the U.S., 9:30-10:00 a.m. is bin 1 of day 1, 10:00-10:30 a.m. is bin 2 of day 1, . . . , 3:30-4:00 p.m. is bin 13 of day 1; for multi-day strategies, 9:30-10:00 a.m. is bin 1 of day 2, etc.

Figure 6:
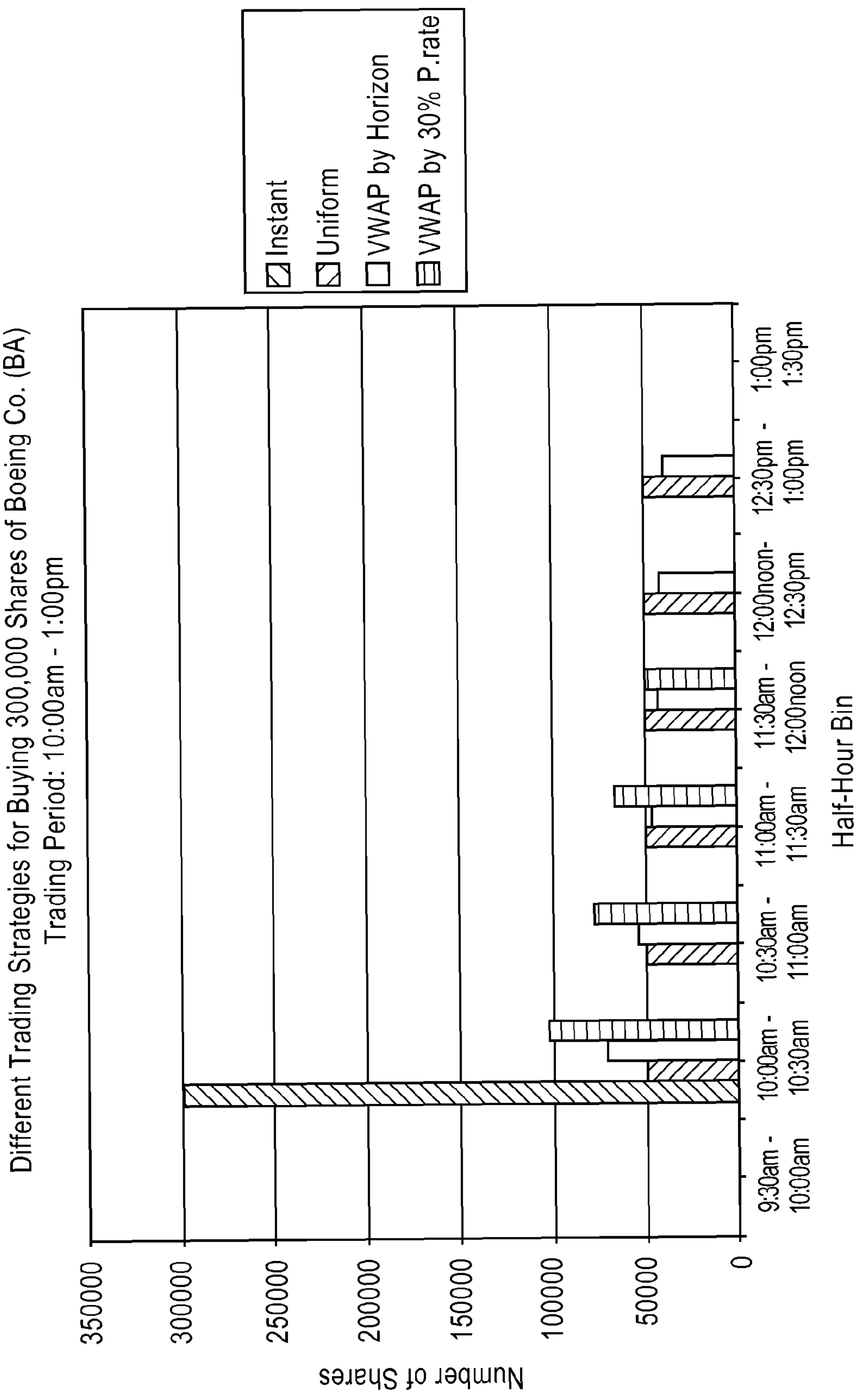
FIG. 6 is a graph illustrating different trading strategies for buying 300,000 shares of Boeing Co.

There are several standard strategies that can be expressed by the bin scheme of ACE:

- The Instant Strategy trades all shares in the starting bin. This strategy can be invoked in ACE® by setting any of the other strategies supported by ACE® to start and end in the same bin.
- The Uniform Strategy assumes the same number of shares to be executed for each bin within the trading horizon. For example, if the order size is 300,000 shares and the trade should be completed between 10:00 a.m. and 1:00 p.m., the uniform strategy suggests executing 50,000 shares within each bin (bins 2 to 7). Bertsimas and Lo (1998) propose uniform strategies to minimize expected costs of trading fixed number of shares.
- The VWAP Strategy by Horizon. For each order input, ACE® generates a prediction of the stock's volume pattern over the desired time horizon, whether partial-day, full day, or multi-day. For each order, the VWAP Strategy by Horizon is a trading strategy that matches the volume pattern of the underlying stock over the desired time horizon, participating more heavily during the periods when volume is expected to be heaviest. This helps to minimize the impact of trading during thin volume periods and allows the order to benefit from the most liquid conditions. FIG. 6 presents the VWAP Strategy by Horizon for a trade of 300,000 shares of stock Boeing Co. (BA) that executes between 10:00 a.m. and 1:00 p.m. Boeing Co. has been selected for illustrative purposes at random. The stock is a relatively liquid stock; its market capitalization is $73.7 billion and the median daily share volume is 3.5 million shares as of May 1, 2007.

FIG. 6 shows different types of trading strategies for buying 300,000 shares (approximately 8.5% of ADV) of Boeing Co. (BA) between 10:00 a.m. and 1 p.m. The stock belongs to the category of relatively liquid stocks, its market capitalization is $73.7 billion and the median daily share volume is 3.5 million shares as of May 1, 2007. The instant strategy places all the shares in the first trading bin (bin 2, i.e. 10:00 a.m.-10:30 a.m.). The uniform strategy assumes the same number of shares to be executed for each bin within the trading period. The VWAP strategies by horizon and by 30% participation rate match the intraday volume pattern of the stock. As the intraday volume suggests, more shares are executed in the early morning.

ADV is the median daily dollar volume for the 21 most recent trading days. The VWAP Strategy by Horizon is compared to the Instant Strategy, Uniform Strategy, and VWAP Strategy by Participation Rate with 30% participation rate. 300,000 shares of Boeing Co. represent approximately 8.5% of average daily volume (ADV) as of May 1, 2007.

Figure 7:
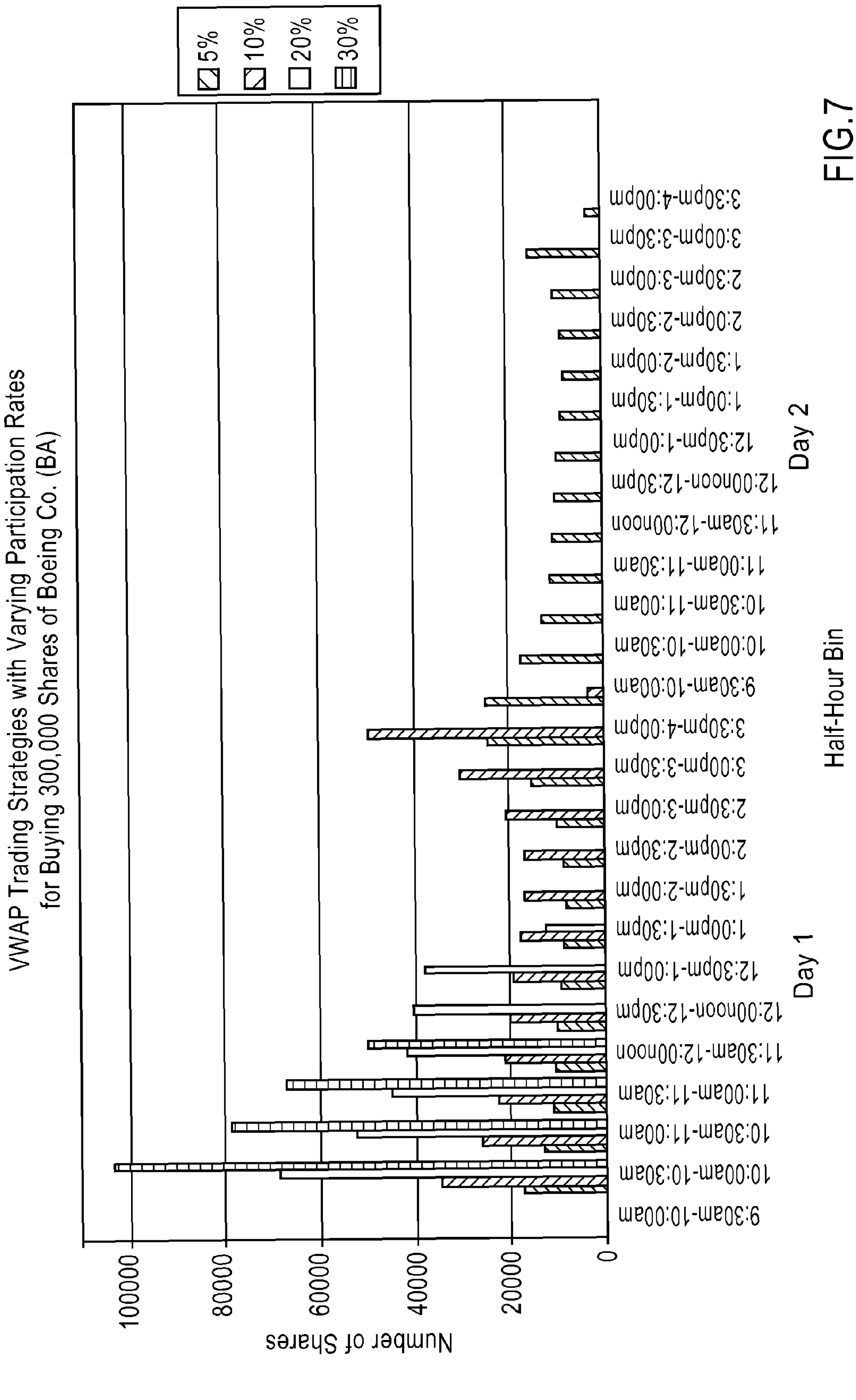
FIG. 7 is a graph illustrating different volume-weighted average price trading strategies for buying 300,000 shares of a security

FIG. 7 shows VWAP trading strategies with varying participation rates (5%, 10%, 20%, and 30%) for buying 300,000 shares (approximately 8.5% of ADV) of Boeing Co. (BA). The stock belongs to the category of relatively liquid stocks, its market capitalization is $73.7 billion and the median daily share volume is 3.5 million shares as of May 1, 2007. In contrast to a VWAP trading strategy by horizon, the trade horizon is not fixed but rather depends on the participation rate. The lower the participation rate, the longer it takes to fill the order.

The VWAP Strategy by Participation Rate is defined similarly to the VWAP Strategy by Horizon. For each order, the trading strategy is formed using the volume pattern of the underlying stock by participating proportionately with the specified participation rate in the estimated day's volume. If the fraction of order size relative to the average daily trading volume is larger than the participation rate, a multi-day strategy with the same intraday stock-specific volume pattern for each day is employed. FIG. 7 displays four VWAP Strategies by Participation Rate with different participation rates (5%, 10%, 20% and 30%) for buying 300,000 shares of BA. The trading always begins at 10:00 a.m. (i.e., in bin 2). The plot shows that the higher the participation rate is, the shorter the time horizon and thus the more aggressive the strategy.

The ACE® Optimal Strategy represents a solution of a very general optimization problem (with time-varying parameters). The ACE® model estimates the expected costs and the standard deviation of the costs of the agency trading strategy that optimally balances the trade-off between paying price impact costs and incurring opportunity costs (for a given level of risk aversion and trading horizon.)

The crucial question facing traders is how to define and quantify trading objectives in order to implement them in an appropriate strategy. This question is non-trivial since common trading objectives often compete with each other and cannot be completely satisfied simultaneously. For example, a cost-minimizing strategy is not necessarily the ideal solution. A trader who minimizes costs by breaking up a trade over a very long time horizon faces risk from significant market movements. But conversely, trading aggressively to control risk implies "front-loading" the order and typically raises costs. Therefore, an optimal strategy should balance both costs and risk. From this perspective, the ACE® Optimal Strategy is a valuable trading tool because it provides a mathematically derived optimal solution given certain model assumptions. These assumptions are discussed in detail below.

Execution costs are subject to a large number of unknown factors. These include, for example, the uncertainty caused by the behavior of other market participants and market movements related to macroeconomic or stock-specific factors. It is impossible to model all these factors. Therefore, we consider execution costs as a random variable rather than as a deterministic value or number. In other words, the same strategy may provide different results if it is executed repeatedly under the same circumstances. Generally, a probability distribution is characterized by a number of parameters. In particular, the mean and standard deviation are widely used in statistics as such parameters. Note that these parameters, in general, do not define a distribution uniquely, but if one assumes certain distributions, it is sufficient to consider only these two parameters to identify the distribution. The normal distribution is one widely used example of such distributions. The mean of the distribution of costs may be interpreted simply as the average value of costs if the execution could be repeated many times. The standard deviation of costs characterizes how much the value of costs may deviate from the expected costs. Therefore, selecting a strategy best suited for given trading objectives is equivalent to selecting the best suited distribution of costs.

Clearly, every trader prefers both lower expected costs and lower risk (standard deviation of costs). Hence, both of these parameters enter the optimization objective function. To find the optimal trading strategy, we need to balance the trade-off between expected costs and the variance of costs. This yields the ACE® optimization problem $$(1-\lambda)\cdot E(C)+\lambda\cdot \mathrm{Var}(C)\rightarrow \min, \quad (4)$$

where C is the total execution costs of the trade, E(C) is the expected value of C, and Var(C) is the variance of C. $\lambda$ is the risk aversion parameter in the interval [0,1]. $\lambda$ can also be considered as "weight on risk." The optimal solution is the trading strategy, among all strategies for a given set of trade side, trade size, and trading horizon that minimizes the objective function in (4).

The ACE® Optimal Strategy is the solution of the optimization problem in (4). It is very important to realize that the solution depends on the trade characteristics and the selected risk aversion parameter. Different trade characteristics and different values of risk aversion produce different ACE® Optimal Strategies. Therefore, it is crucial to understand how to select the inputs into the optimization problem according to each particular situation.

Figure 8:
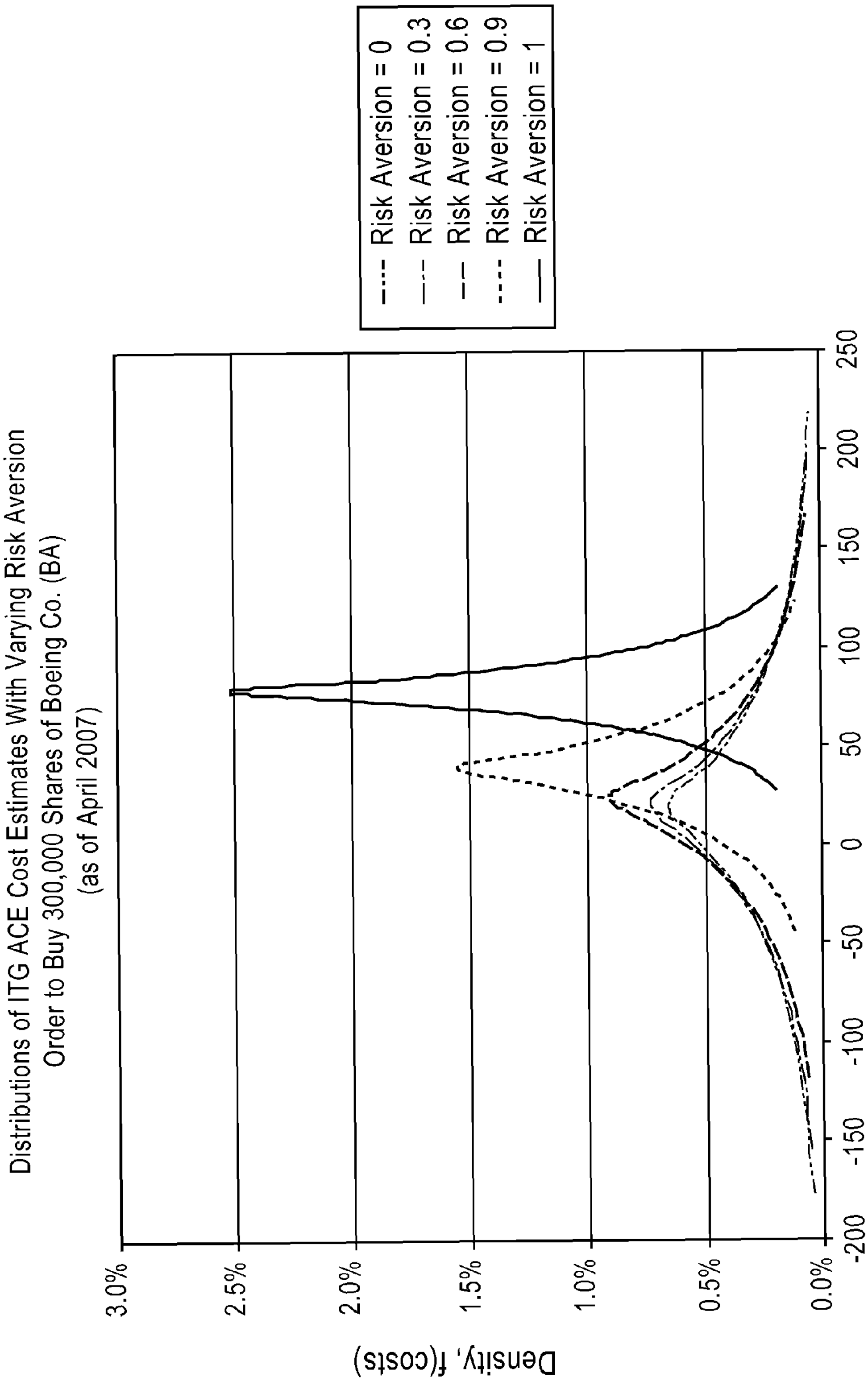
FIG. 8 is a graph illustrating different distributions of transaction cost estimates.

The side and size of a trade are usually given, but a user may select the trade horizon and the risk aversion parameter. In order to select them more effectively, it is useful to be reminded that more aggressive trading strategies have higher expected costs, but a lower standard deviation of costs. Both, a shorter trading horizon and a higher value of risk aversion correspond to a more aggressive trading strategy. FIG. 8 shows several probability distributions of execution costs for different risk aversions with a fixed one-day horizon for an order to buy 300,000 shares of Boeing Co. (BA). The plot reveals that a higher risk aversion provides lower expected costs but higher standard deviation and thus, greater uncertainty. Therefore, a user should make a selection based on appropriate values of both expected costs and standard deviation of costs.

FIG. 8 illustrates the distributions of Non-Discretionary transaction cost estimates based on different values of risk aversion (0, 0.3, 0.6, 0.9, and 1) for an order to buy 300,000 shares (approximately 8.5% of average daily volume (ADV)) of Boeing Co. (BA). The distributions are based on ACE® Optimal Strategies with a one-day trading horizon. The plot suggests that the choice of a greater risk aversion provides higher expected costs, but lower standard deviation of costs and, thus, potentially less opportunity costs.

Figure 9:
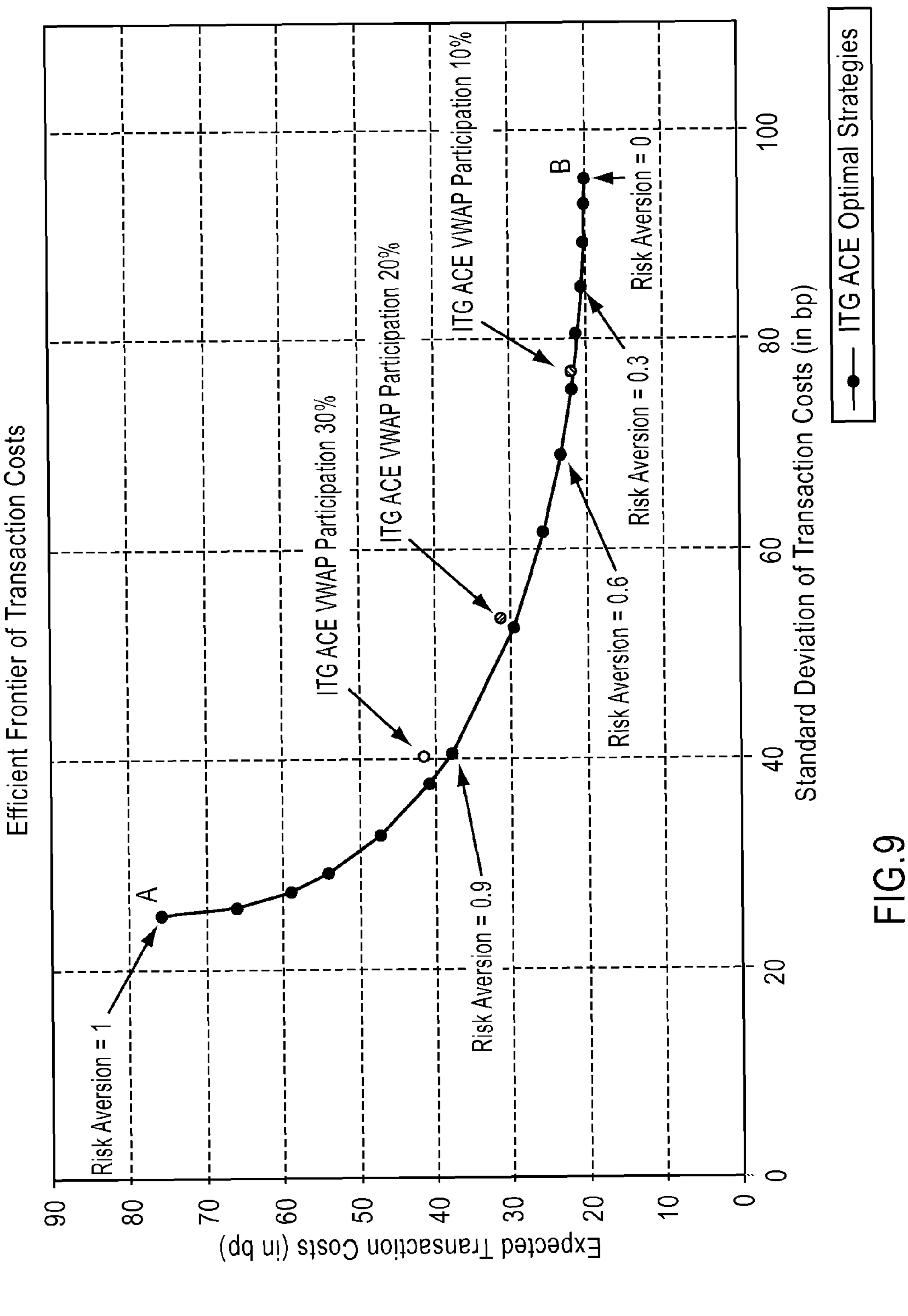
FIG. 9 is a graph illustrating an efficient frontier of transaction costs.

The following example demonstrates how to make such a selection: Suppose we need to buy again 300,000 shares of the stock Boeing Co. (BA) in one day. We could trade the order using a variety of strategies—some more passive and some more aggressive. Each of these strategies has a corresponding risk aversion parameter. FIG. 9 shows the possible expected cost/risk outcomes for various risk aversions. For most traders, a risk aversion of zero is too passive: while the expected costs are low the risk is very high. The high risk due to the long trading horizon implies the possibility of executing at inferior prices—potentially destroying any alpha that a particular investment was anticipated to capture. However, if volatility in transaction costs is of no concern, then this strategy is the best since it will, over many orders, average to the lowest costs. Conversely, a risk aversion of one produces a very low-risk trading strategy, but with exceptionally high costs—yet another way to destroy alpha. The solution to avoiding these two extreme outcomes is to choose a risk aversion that balances costs and risk somewhere between the extremes.

FIG. 9 graphically displays ACE® Optimal Strategies for different risk aversions for an order to buy 300,000 shares (approximately 8.5% of ADV) of Boeing Co. (BA) using Non-Discretionary. The 300,000 share order corresponds to about 8.5% of ADV. Obviously, there are many choices of optimal strategies between the two extremes of minimizing expected transaction costs (Point B) and minimizing the standard deviation of transaction costs (Point A). Each point on the efficient frontier corresponds to a specific risk aversion. The graph highlights selected risk aversion values. From left to right, one can see that one can incrementally reduce the expected transaction costs of a trading strategy (relative to the most expensive) by assuming more risk. Somewhere along this "efficient frontier" of transaction costs is a strategy that, beyond which, begins to accumulate more risk than the reduction in expected transaction costs is worth. This would be a desirable choice of risk aversion. For comparison, trading strategies other than ACE® Optimal Strategies are also included. As expected, theses alternative trading strategies do not lie on the efficient frontier as they are not optimal: There are trading strategies with lower expected transaction costs with the same standard deviation of transaction costs, or there are trading strategies with the same expected transaction costs, but lower standard deviation of transaction costs. Note, for all strategies the trading horizon was restricted to one trading day (with potential start in the first bin). For the VWAP By Participation Strategies, the order size is sufficiently small to ensure that the trading horizon is less than one trading day.

As FIG. 9 demonstrates, trading strategies based on high risk aversion have low opportunity costs (opportunity costs are measured as the standard deviation of the transaction cost distribution). This lower standard deviation is achieved by trading more shares earlier in the trading horizon—which is closer to the decision price. The decision price is the prevailing price at the time the decision to place the order is made. This "front-loading" tends to move the stock price more rapidly in the unfavorable direction than an order executed more patiently. In the ACE® framework, this movement in the stock price is market impact. Therefore, if you desire low opportunity costs (low uncertainty in the transaction costs or low standard deviation) then you must be prepared to pay more market impact costs. If you are willing to keep open the chance of having large realized opportunity costs, you can slow the order execution down and avoid high market impact costs.

Figure 10:
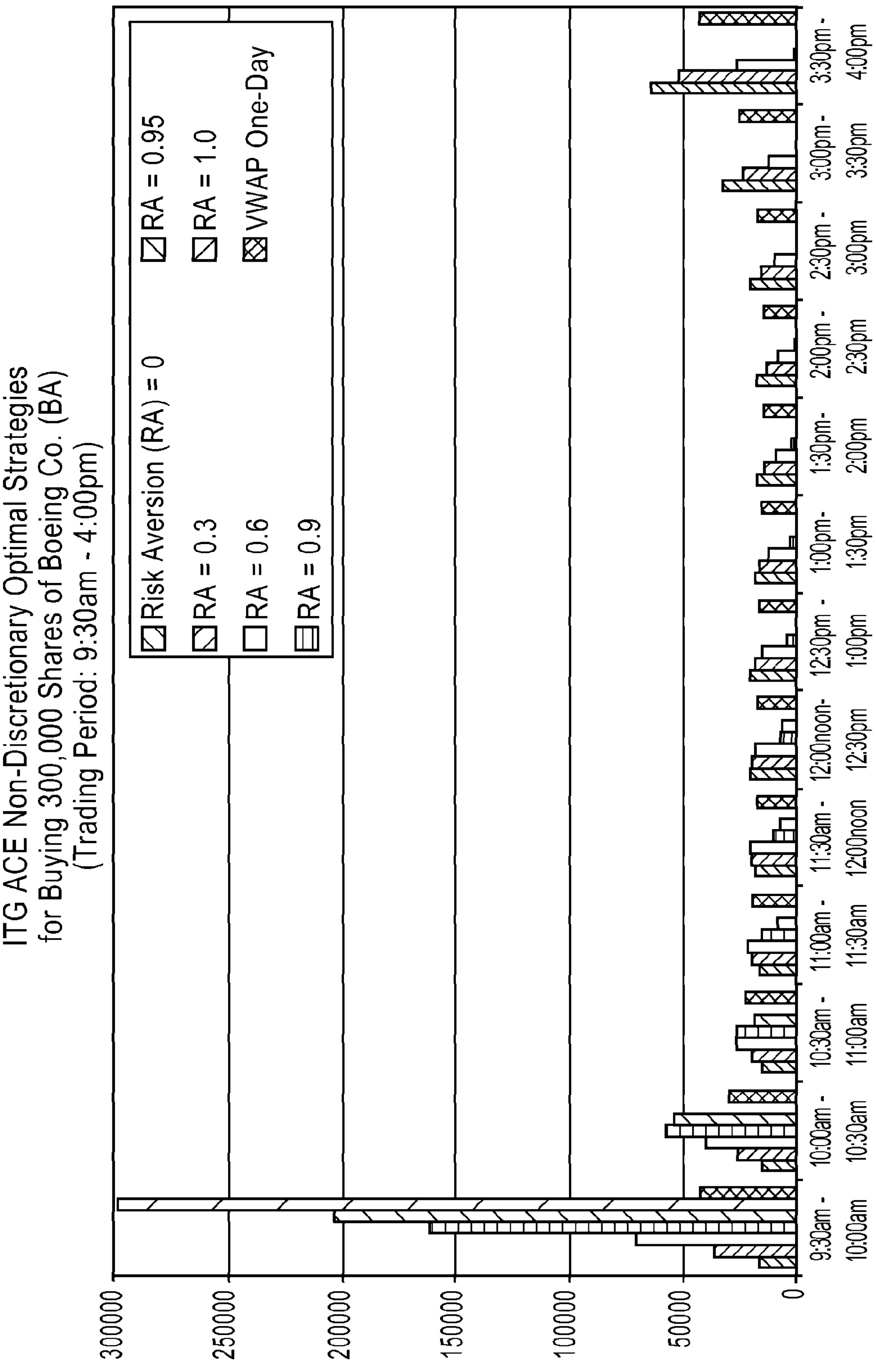
FIG. 10 is a graph illustrating different optimal trading strategies for buying 300,000 shares of a security.

FIG. 10 shows the ACE® Optimal Strategies of ACE/2 Non-Discretionary for buying 300,000 shares (approximately 8.5% of ADV) of Boeing Co. (BA) obtained using values of risk aversion of 0, 0.3, 0.6, 0.9, 0.95 and 1, and a one-day trading horizon. Also shown is a VWAP Strategy by Horizon with a one-day trading horizon. The ACE® Optimal Strategy for larger risk aversion parameters always suggests to trade more aggressively at the beginning of the trading horizon to minimize opportunity costs.

Figure 11:
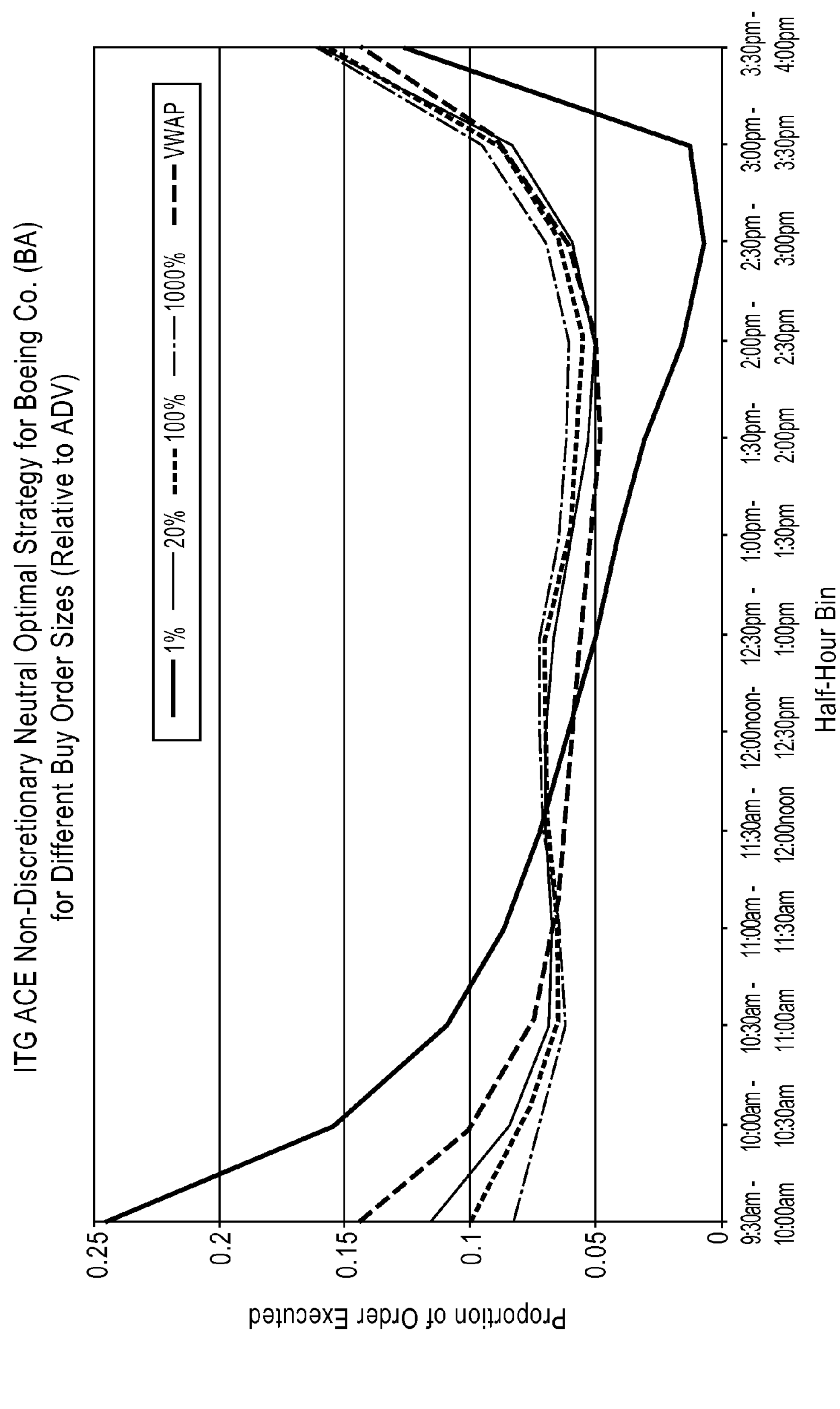
FIG. 11 is a graph illustrating different neutral optimal trading strategies for different buy order sizes of a security.

FIG. 11 illustrates different ACE® Optimal Strategy trading distributions for risk aversion 0.3 (ACE/2 Non-Discretionary Neutral) and fixed one-day horizon for Boeing Co. (BA) and different order sizes (15, 20%, 100%, and 1000% of ADV). FIG. 9 also shows the trading distribution for a one-day VWAP trading strategy. The chart shows that risk aversion 0.3 yields ACE® Optimal Strategies that are close to a VWAP trading strategy. Moreover, the ACE® Optimal Strategy becomes more and more back-loaded with increasing order size due to market impact costs.

Such a selection becomes more complicated if the trading horizon needs to be selected in addition to the risk aversion parameter, but the approach remains the same. As an alternative, ACE® can be configured to determine an "optimal" trading horizon for an order, thereby leaving the selection of risk aversion as the only user-specified input parameter.

The selection of the trading horizon for an order is another parameter users need to choose. ACE® can provide an optimal trading horizon. The solution of finding such an optimal trading horizon may vary in practical situations. After considering client's feedback and analyzing several different approaches, the following method proved to be the best suited for ACE® implementations. ACE® continues to increment the number of days by one until the expected transaction costs in equation (1) of the optimization problem decreases by less than a threshold value. In other words, the method suggests that there is no need to extend the trading horizon for one more day if the benefit of extending the horizon is not significant. This significance is determined by an algorithm that accounts for order size, costs, and volatility. The order-dependent threshold adjusts so that very large orders have a low cost to share value ratio as threshold, whereas smaller orders have a higher cost to share ratio as threshold. Additionally, more volatile names have a higher threshold since adding an additional trading day will increase the variance term significantly. In general, thresholds are around 3-5 bps but can be lower for very large order sizes.

FIG. 12 illustrates the expected treading costs, standard deviation of trading costs, and trading horizons for different values of risk aversion for ACE® Discretionary and ACE® Non-Discretionary, respectively. The underlying order is to buy a) 300,000 shares (approximately 8.5% of ADV) or b) 1,500,000 shares (approximately 42.5% of ADV) of stock BA (Boeing Co.). The cost estimates are based on ACE® Optimal Strategies. Panel A reports values in cents and Panel B in basis points. ACE® is computed based on information as of May 1, 2007.

According to aspects of the present invention, client-specific "alpha" models may be included into the ACE® analysis through input of intra-day expected returns. However, using non-zero expected returns to generate ACE® Optimal Strategies has one potential complication. ACE® may suggest optimal strategies which include orders of opposite direction to that of the overall order. For example, consider a sell order and assume constant positive expected intraday returns. As the stock price is expected to be higher at the end of the day, a profitable strategy for a trader is to buy shares at the beginning of the day and then sell the entire position at the end of the day at a higher price. Such a strategy is an optimal solution of the ACE® optimization problem, but users view it as undesirable since the strategy would try to benefit from short-term price movement predictions, which is not what ACE® is built for. ACE® can be constrained to require that all bin executions of the ACE® Optimal Strategy are on the same side of the market. Moreover, additional bin volume constraints can be added to the optimization problem such as trading at least 1% and at most 20% of historic average bin share volume in each bin.

The modeling of both temporary and permanent price impact is the most complex and crucial part of ACE. Various ways of specifying a price-impact function can be found in the academic literature. The simplest method is to assume a linear relationship between the (absolute or relative) price change caused by a trade and the trade's size. Typically, trade size is the number of shares executed, either in absolute terms or relative to the average (or median) total number of shares traded throughout the trade's duration.

Examples of articles that assume a linear price-order flow relation are Kyle (1985), Bertsimas and Lo (1998), Breen, Hodrick and Korajczyk (2002), and Farmer, J. D. (2002). Kyle presents one of the seminal market microstructure models that derives equilibrium security prices when traders have asymmetric information. In Bertsimas and Lo, the authors introduce a price impact model and apply stochastic dynamic programming to derive trading strategies that minimize the expected costs of executing a portfolio of securities over a fixed time period. Breen, Hodrick and Korajczyk develop a measure of liquidity and quantify the change in a stock price by the observed net trading volume. Farmer studies the internal dynamics of markets—for example, volatility clustering—proposing a non-equilibrium price formation rule.

Although initial models of price impact were linear with respect to trading volume, empirical evidence shows existence of non-linearities. Hasbrouck (1991a), (1991b) investigates non-linearities in the impact of trades on midquotes and reports an increasing, concave relation between price impact and order flow for several stocks traded on the NYSE. De Jong, Nijman and Roell (1995) use data on French stocks traded on the Paris Bourse and SEAQ International and show that the assumption of a linear impact of orders on prices is incorrect. Kempf and Korn (1999) use intraday data on German index futures to come to the same conclusion. Zhang (1999) offers a heuristic derivation of a non-linear market impact rule. For more discussions of empirical evidence concerning non-linearity of market impact, see, e.g., Hausman, Lo and McKinlay (1992) or Chan and Lakonishok (1993). Nonlinear price impact models can be found, for instance, in Seppi (1990), Barclay and Warner (1993), Keim and Madhavan (1996), and Chen, Stanzi and Watanabe (2002). While Seppi, and Keim and Madhavan focus on the different impacts of block trades and market trades on prices, Barclay and Warner justify the non-linearity in the price-order flow relation by the "stealth-trading" hypothesis. This hypothesis claims that privately informed traders concentrate their trades in the medium size range. Since medium-size trades are associated with informed trading, larger trades add relatively little additional information. This results in a concave price-order flow relation.

ACE® supports two different price impact models, serving both the U.S. and international markets—ACE/1 and ACE/2. Both methodologies belong to the non-linear class of models discussed above. ACE® allows for non-linear temporary and permanent price impact functions.

ACE/1 uses an enhanced version of the original ACE® price impact model. The original model assumed that price impact is a linear function of trade size, with coefficients based on stock-specific volume and volatility estimates. While this original version was only applicable for relatively small orders not higher than 30% of the stock's ADV, the enhanced ACE/1 methodology provides meaningful transaction cost estimates beyond a 30% of ADV order size.

The ACE/2 price impact model is a sophisticated mathematical/econometric model that is in line with recent academic empirical findings. It uses an econometric technique to estimate price impact functions based on market tick data. This technique is at the core of ACE/2 and depends on several stock-specific parameters that are estimated daily and monthly using market data for every stock in the ACE® universe. Methods developed by the ITG Financial Engineering group provide accurate estimates for different segments of the universe (exchange-specific and by liquidity group). This task is most challenging for illiquid stocks and varying methodologies are applied for segments of stocks with different liquidity characteristics. Permanent price impact coefficients are estimated based on one year's of tick data similar to the method in Hasbrouck and Seppi (2001). In particular, we aggregate trading for each stock over 30-minute intervals and measure price changes using the quote mid-points at the beginning and end of each interval. The observed price changes (normalized by the historical volatility for the bin) are regressed against the corresponding trade imbalances and approximated by a concave, bin-specific function. Assuming market equilibrium in the ACE® framework, the resulting functions can be used to forecast the accumulated price impact within a 30-minute interval caused by partial fills of the order.

FIGS. 13 through 16 show the empirical and theoretical ACE® permanent price impact functions for bin 1 for four different stock segments: the most liquid U.S. Listed stocks, all Listed stocks, the most liquid OTC stocks, and all OTC stocks. The graphs show that the empirical functions become noisier when one restricts the stock universe. Nevertheless, all smoothed theoretical functions exhibit the same behavior and they can be characterized by three parameters: the slope s, the value x that represents the order size at which concavity starts and the concavity parameter alpha. Empirical evidence suggests that this behavior holds for all liquidity groups and all time intervals of the day.

Figure 13:
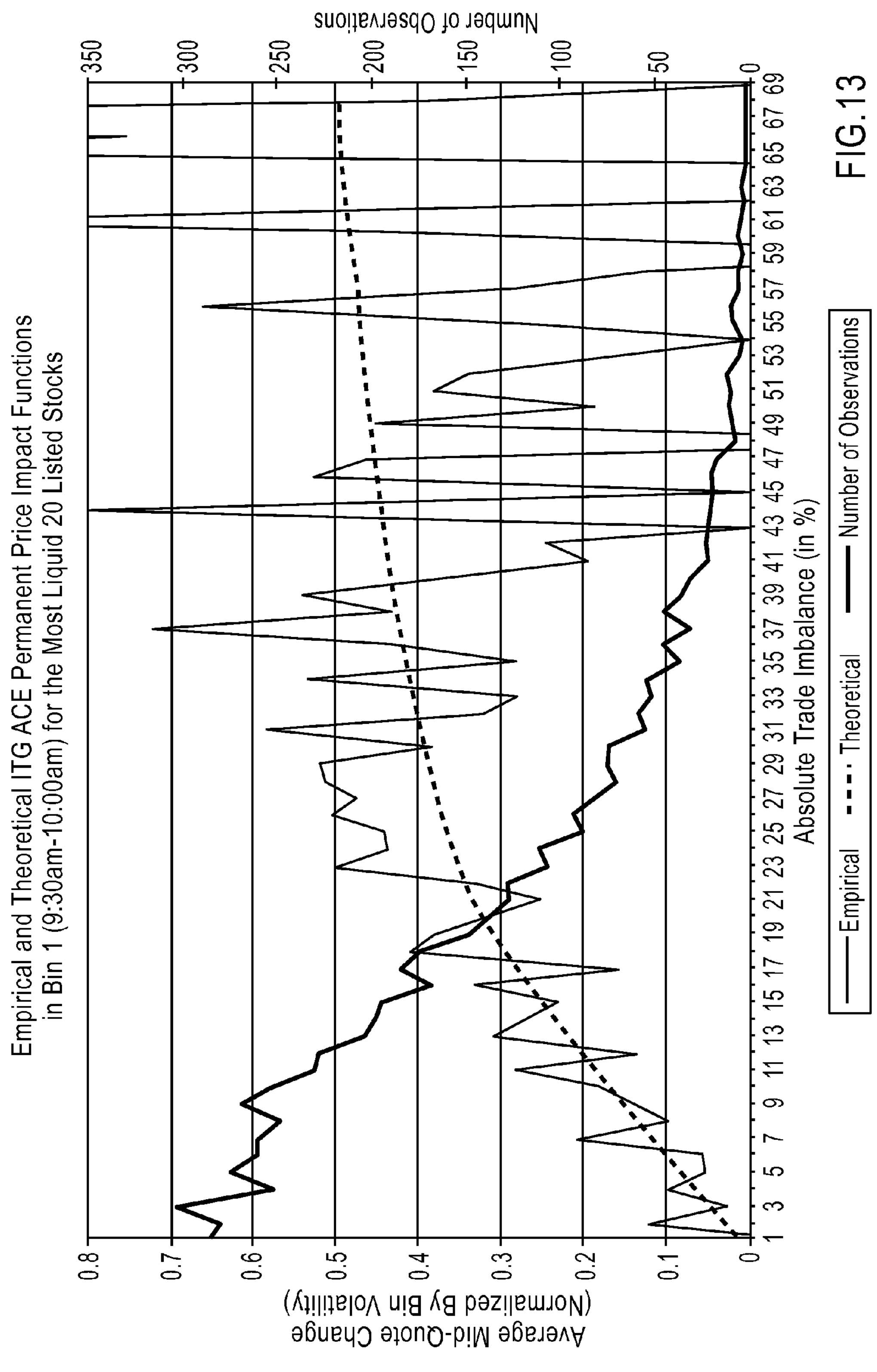
FIG. 13 is a graph illustrating empirical and theoretical permanent price impact functions.

FIG. 13 shows the empirical permanent price impact function in bin 1 (9:30 a.m.-10:00 a.m.) for the most liquid, U.S. Listed stocks (solid line). The empirical permanent price impact function is obtained by segmenting the observations in trade imbalance groups and then taking averages in each group. The empirical permanent price impact is linear until some point when it becomes concave. This behavior is the same for all time intervals, liquidity groups, and markets and can be observed for both permanent and temporary price impacts. Consequently, all theoretical price impact functions in ACE® are characterized by three parameters: the slope s, the value x that represents the order size at which concavity starts, and the concavity parameter alpha. The dashed line shows the fitted theoretical permanent price impact function.

Figure 14:
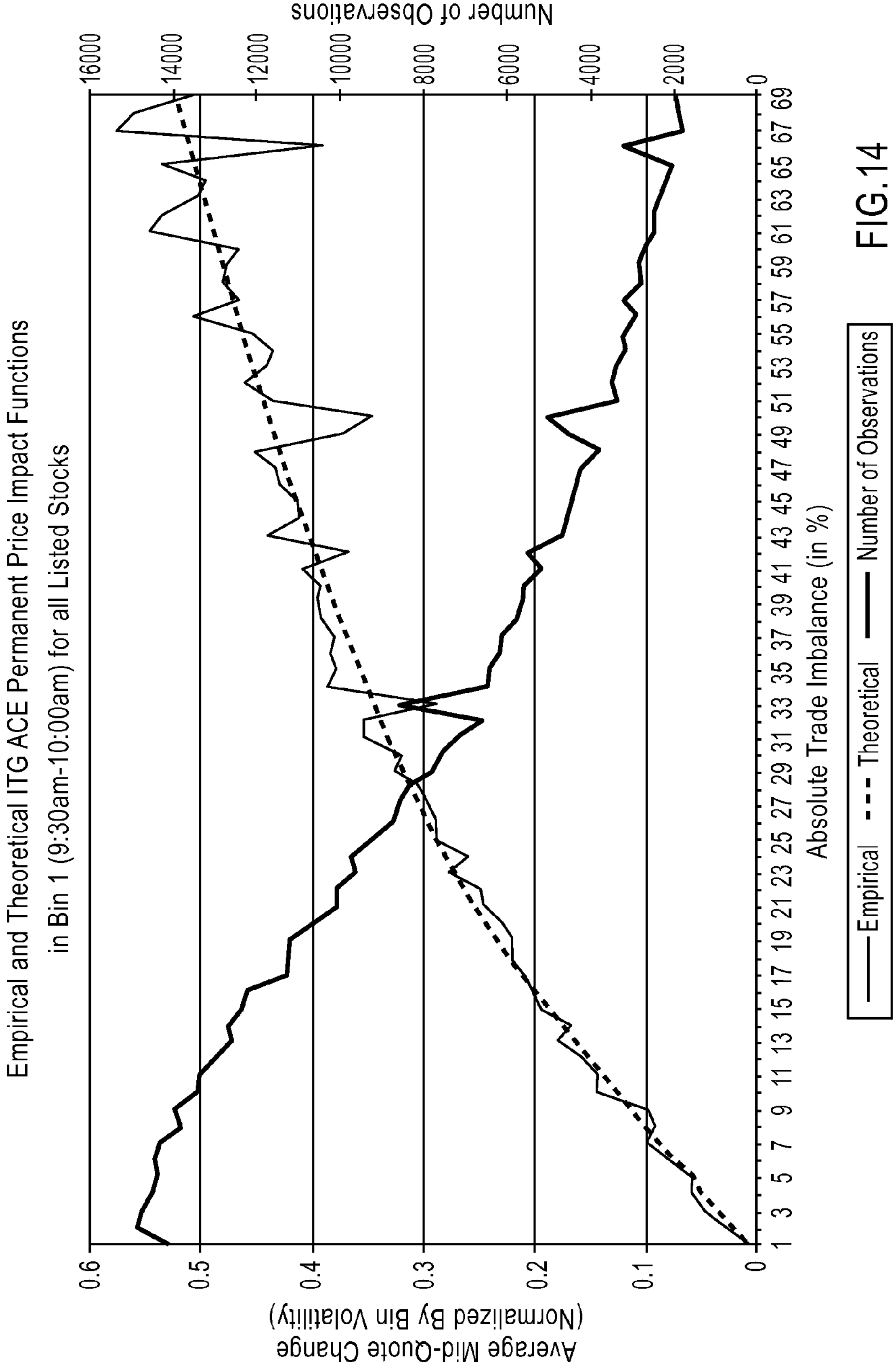
FIG. 14 is a graph illustrating empirical and theoretical permanent price impact functions.

FIG. 14 shows the empirical permanent price impact function in bin 1 (9:30 a.m.-10:00 a.m.) for the all U.S. Listed stocks (solid line). The empirical permanent price impact function is obtained by segmenting the observations in trade imbalance groups and then taking averages in each group. The empirical permanent price impact is linear until some point when it becomes concave. This behavior is the same for all time intervals, liquidity groups, and markets and can be observed for both permanent and temporary price impacts. Consequently, all theoretical price impact functions in ACE® are characterized by three parameters: the slope s, the value x that represents the order size at which concavity starts, and the concavity parameter alpha. The dashed line shows the fitted theoretical permanent price impact function. Compared to FIG. 13, the empirical permanent price impact function is much smoother due to the aggregation over all U.S. Listed stocks.

Figure 15:
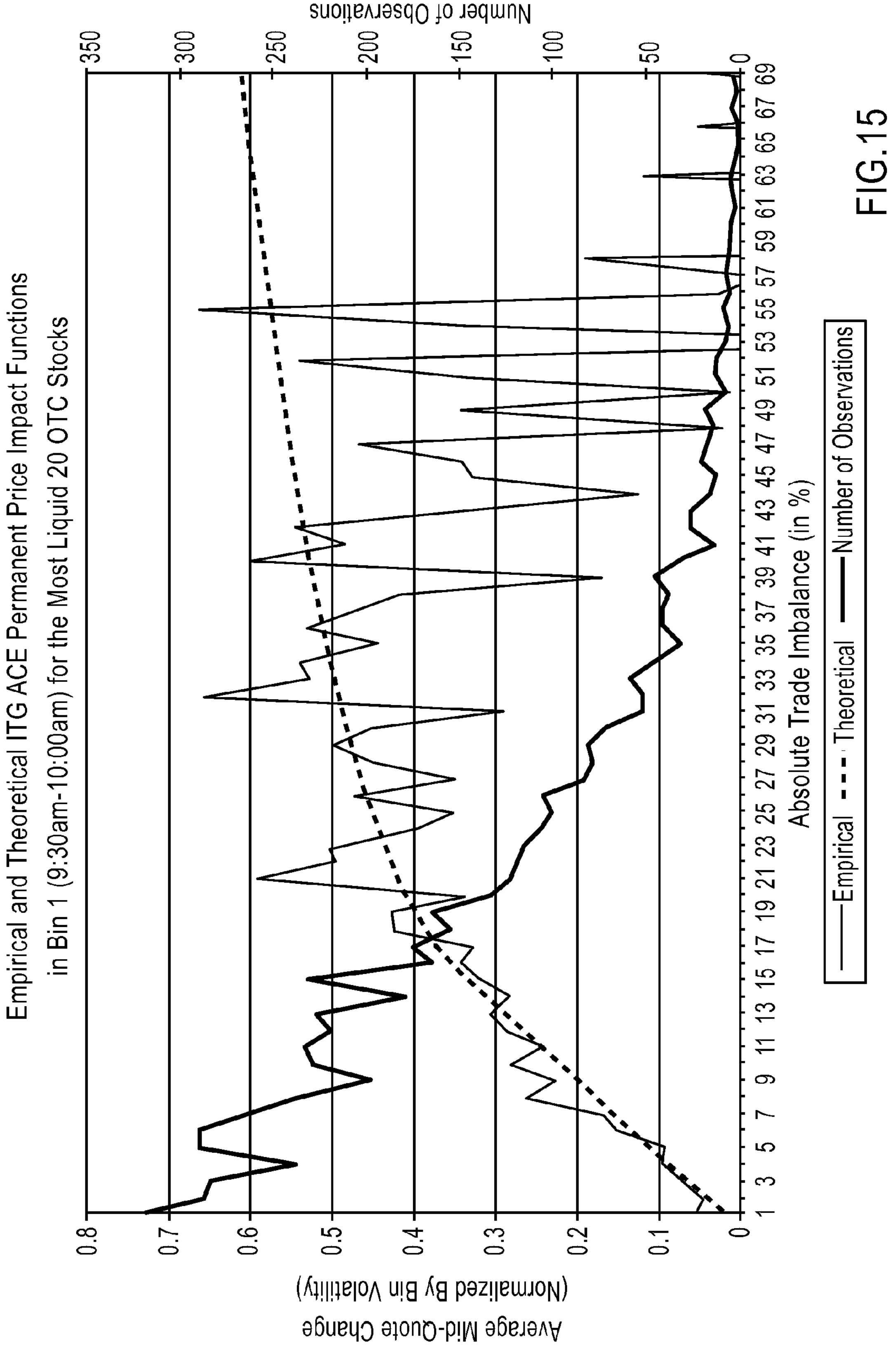
FIG. 15 is a graph illustrating empirical and theoretical permanent price impact functions.

FIG. 15 shows the empirical permanent price impact function in bin 1 (9:30 a.m.-10:00 a.m.) for the most liquid, U.S. OTC stocks (solid line). The empirical permanent price impact function is obtained by segmenting the observations in trade imbalance groups and then taking averages in each group. The empirical permanent price impact is linear until some point when it becomes concave. This behavior is the same for all time intervals, liquidity groups, and markets and can be observed for both permanent and temporary price impacts. Consequently, all theoretical price impact functions in ACE® are characterized by three parameters: the slope s, the value x that represents the order size at which concavity starts, and the concavity parameter alpha. The dashed line shows the fitted theoretical permanent price impact function.

Figure 16:
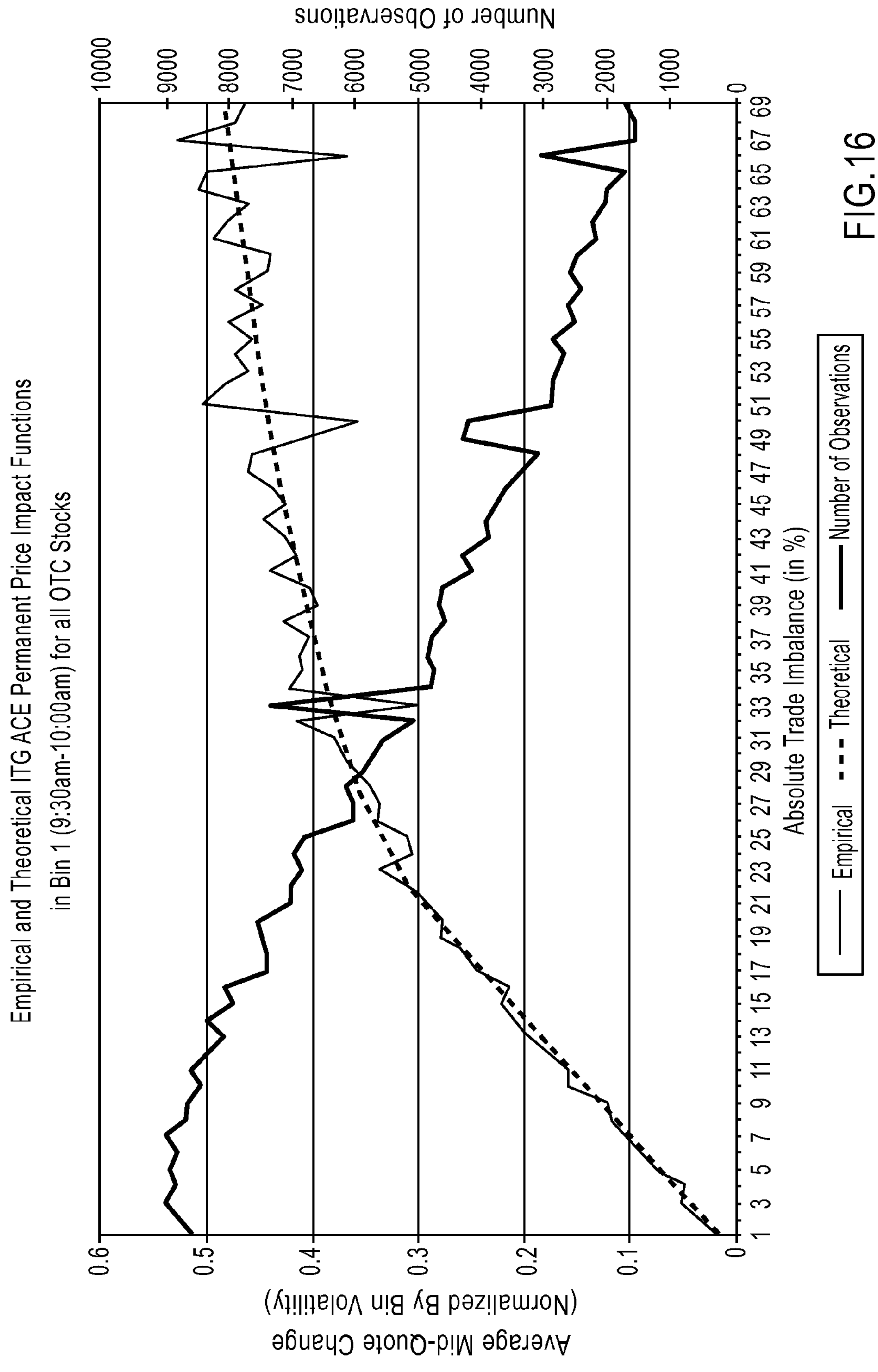
FIG. 16 is a graph illustrating empirical and theoretical permanent price impact functions.

FIG. 16 shows the empirical permanent price impact function in bin 1 (9:30 a.m.-10:00 a.m.) for the all U.S. OTC stocks (solid line). The empirical permanent price impact function is obtained by segmenting the observations in trade imbalance groups and then taking averages in each group. The empirical permanent price impact is linear until some point when it becomes concave. This behavior is the same for all time intervals, liquidity groups, and markets and can be observed for both permanent and temporary price impacts. Consequently, all theoretical price impact functions in ACE® are characterized by three parameters: the slope s, the value x that represents the order size at which concavity starts, and the concavity parameter alpha. The dashed line shows the fitted theoretical permanent price impact function. Compared to FIG. 13, the empirical permanent price impact function is much smoother due to the aggregation over all U.S. OTC stocks.

Figure 17:
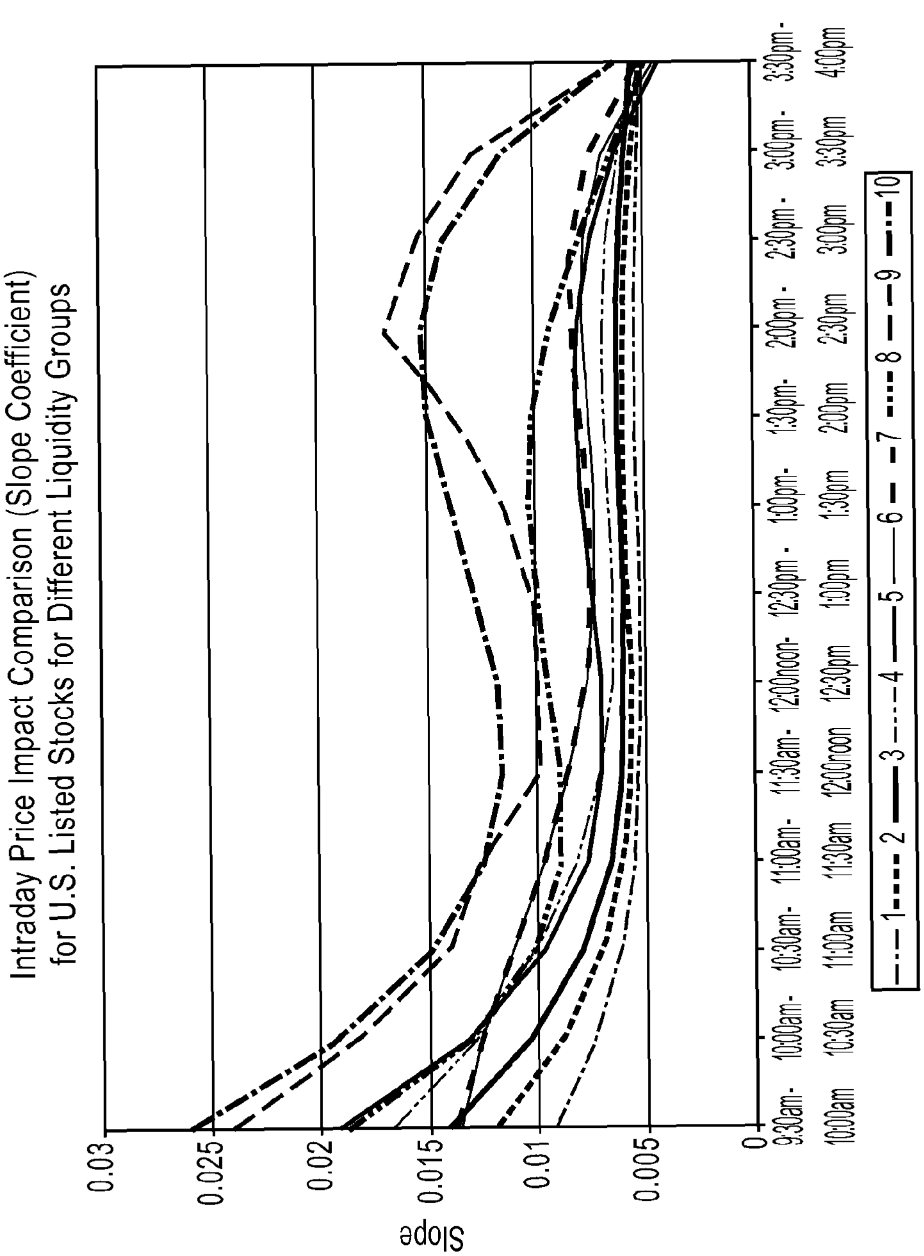
FIG. 17 is a graph illustrating intraday price impact comparisons.

FIG. 17 illustrates the intraday pattern of the slopes of the permanent price impact functions for U.S. Listed stocks. The stocks are segmented into 10 different liquidity groups. Stocks in all liquidity groups show the same intraday pattern. The price impact is the largest in the morning and is relatively low around noon and at the close.

Figure 18:
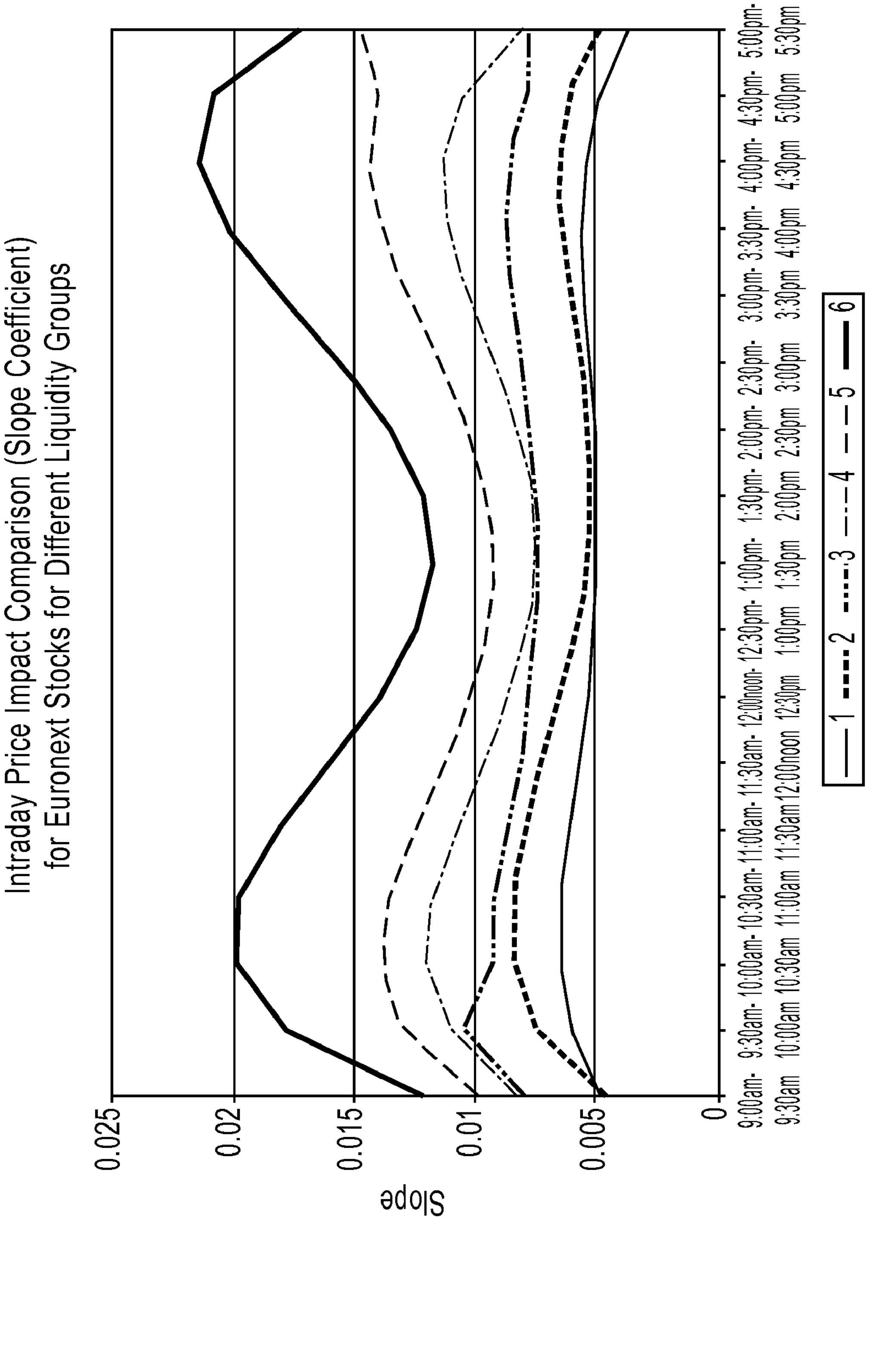
FIG. 18 is a graph illustrating intraday price impact comparisons.

FIG. 18 illustrates the intraday pattern of the slopes of the permanent price impact functions for Euronext stocks. Euronext is the combined market of France, Belgium, Netherlands and Portugal. The stocks are segmented into six different liquidity groups. Stocks in all liquidity groups show the same intraday pattern. The price impact is small in the morning, around noon, and at the close.

Extensive research and testing with U.S. and international execution data have demonstrated the accuracy of the approach for orders up to 100% ADV. The price impact methodology is available for the U.S. market and the most liquid international markets (21 countries in total). FIG. 19 lists the countries currently covered by different ACE modules, ACE/1 and ACE/2.

In ACE/2, the magnitude of price impact for each security and order size is defined by a quarterly calibration to ITG's Peer Group Database. As such, the price impact functions are sensitive to the orders contained in the database. Since the database is extremely large and comprehensive, it contains executions representing not only a wide spectrum of sizes, brokers, execution venues, and stock characteristics, but a broad range of trading behavior stemming from investment management styles, market conditions, trade motivations, and news events. This richness of the dataset allows the unique opportunity to provide transaction cost estimates that reflect more than a "market average" trading behavior.

For those seeking cost estimates that reflect what market participants in aggregate pay, a dataset including all orders is appropriate. The suitability of each of these estimates is guided by the nature of the orders to be benchmarked, and will vary by institution and within an institution, by manager or investment style.

To accommodate the need for two benchmarks for identical orders (besides the amount of discretion), starting with ACE/2.3, ACE/2 has the ability to provide two different cost estimates—one based on orders that have been fully executed no matter how the market conditions were and another based on all executed orders. From a pre-trade perspective, the ACE® Non-Discretionary estimate is highly suitable for vetting trading strategies and determining the feasibility of executing an order in its entirety. The more general ACE® Discretionary cost estimate provides a number that is suitable for comparing incurred transaction costs with what other participants experience. Systematically under- (or over-) performing compared to this number might suggest a trend in an institution's competitiveness. From a post-trade perspective, the choice of price impact models should be guided by the prevailing nature of the order. For example, orders that require immediate and continuous trading until completion should be compared against a cost estimate derived from a price impact model that reflects determined, non-opportunistic trading (ACE® Non-Discretionary). However, an exception to this might be if the impetus for order creation frequently results from an observation of favorable market conditions or if orders are often not fully executed.

The associated price impact coefficients for ACE® Non-Discretionary and ACE® Discretionary are derived from different subsets of the same peer group database. For the ACE® Discretionary model, the entire database of orders minus those eliminated by outlier filtering is included in the calibration process. For the ACE® Non-Discretionary model, a sophisticated set of heuristics is used to eliminate database participants that exhibit opportunistic trading. These methods focus on identifying participants whose orders do not meet minimum transaction cost requirements with respect to increasing order size. More precisely, all orders of clients who have unusually low average transaction costs for a given exchange, liquidity group, and order size segment are filtered out. Liquidity groups are defined based on the deciles of the average daily dollar volume distribution from all stocks. Order size segments are defined as 0-1%, 1-5%, 5-10%, 10-25%, 25-50% and >50% of average daily share volume. The grouping is justified by the fact that different accounts or portfolio managers can trade very differently within the same firm. Actual average costs of a client are considered to be abnormally low (signaling opportunistic trading) if they are lower than a cutoff for the specific segment. The cutoff is determined by two thresholds:

a) based on a certain cutoff that equals the average half spread for all orders multiplied by a certain factor for the given segment (e.g. the factor is 1 for order sizes around 15% of ADV), b) based on the average realized costs of all market participants.

If the average trading costs of a client is less than both of the two thresholds determined by a) and b) above, the client's trading style for this segment is classified as opportunistic and is filtered out for ACE® Non-Discretionary.

Figure 20:
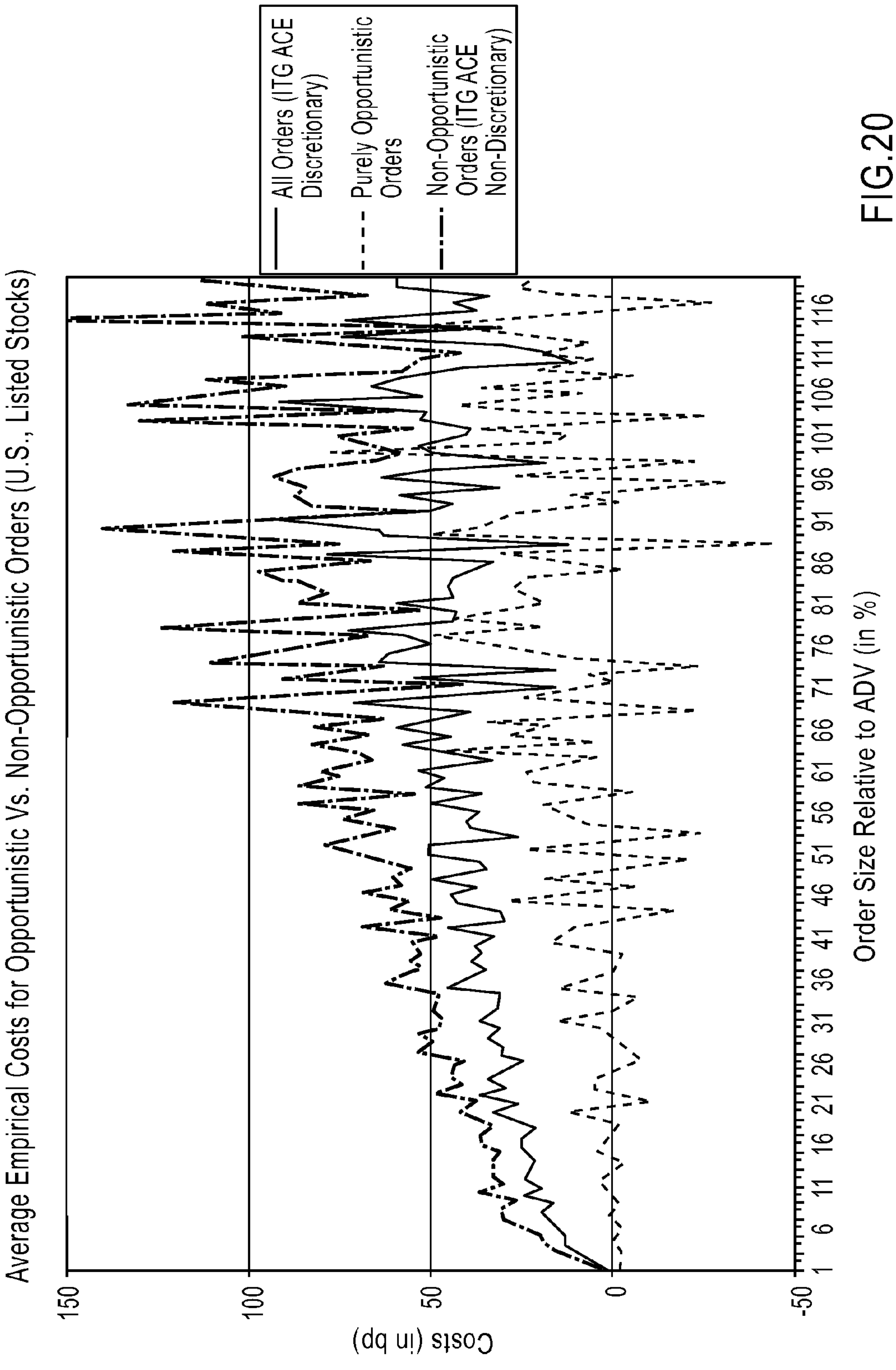
FIG. 20 is a graph illustrating average empirical costs.
Figure 21:
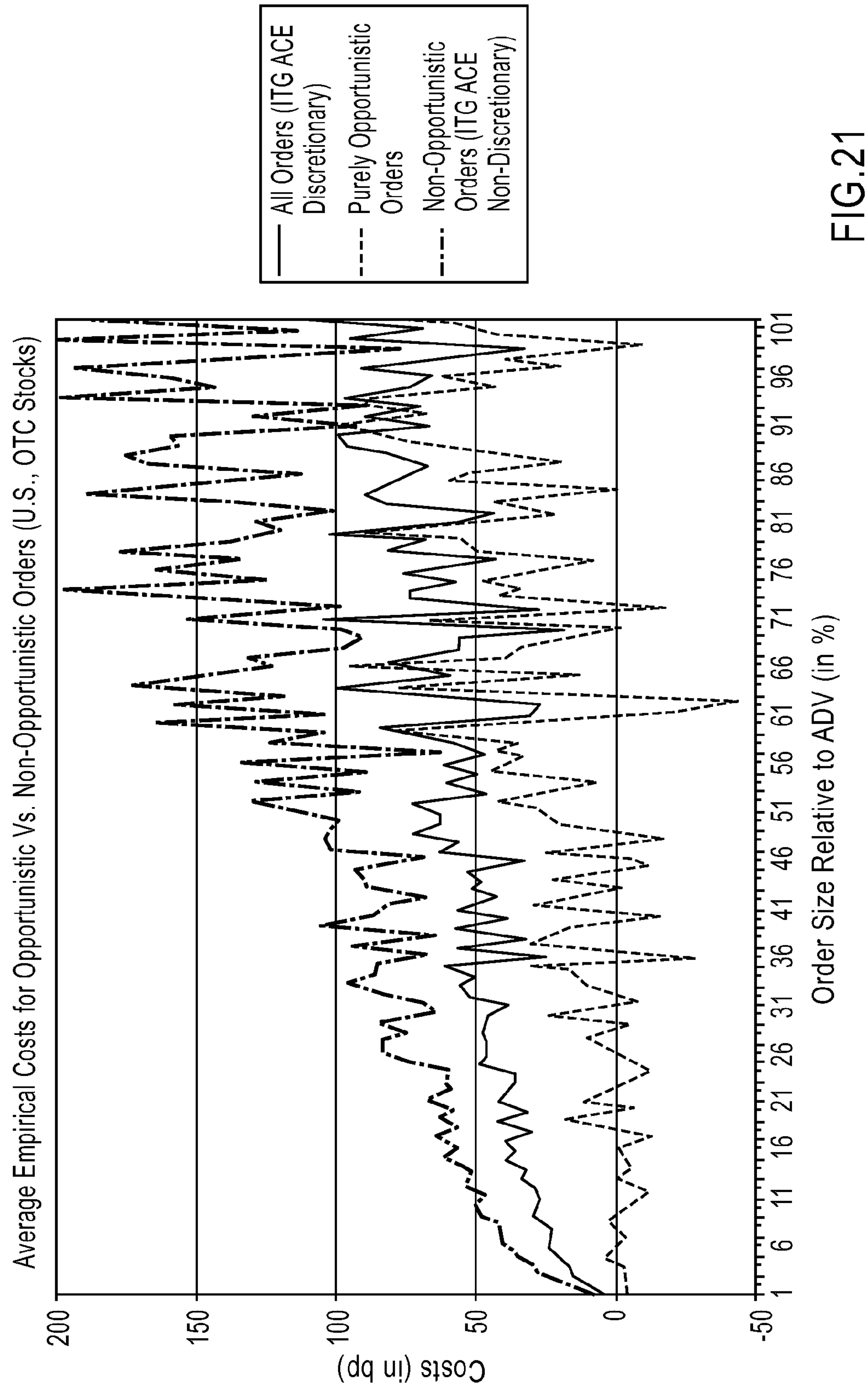
FIG. 21 is a graph illustrating average empirical costs.

FIG. 20 and FIG. 21 plot the average realized costs curves that are associated with ACE® Discretionary and ACE® Non-Discretionary along with the average realized cost curve for opportunistic orders for Listed and OTC stocks, respectively. In both charts it is apparent that opportunistic orders are very different, they have very low costs, often close to zero and costs do not increase with order size. The cost curve associated with ACE® Non-Discretionary is above the cost curve associated to ACE® Discretionary, as expected. Excluding the opportunistic orders pushes the cost curve up. As discussed above, the difference in the curves is bigger the larger the order size is. It is likely that the larger an order is, the more care is applied and the more discretion is given to the trader.

The underlying execution data is the ITG PEER GROUP Database during the period from January 2005 to December 2006.

Figure 22:
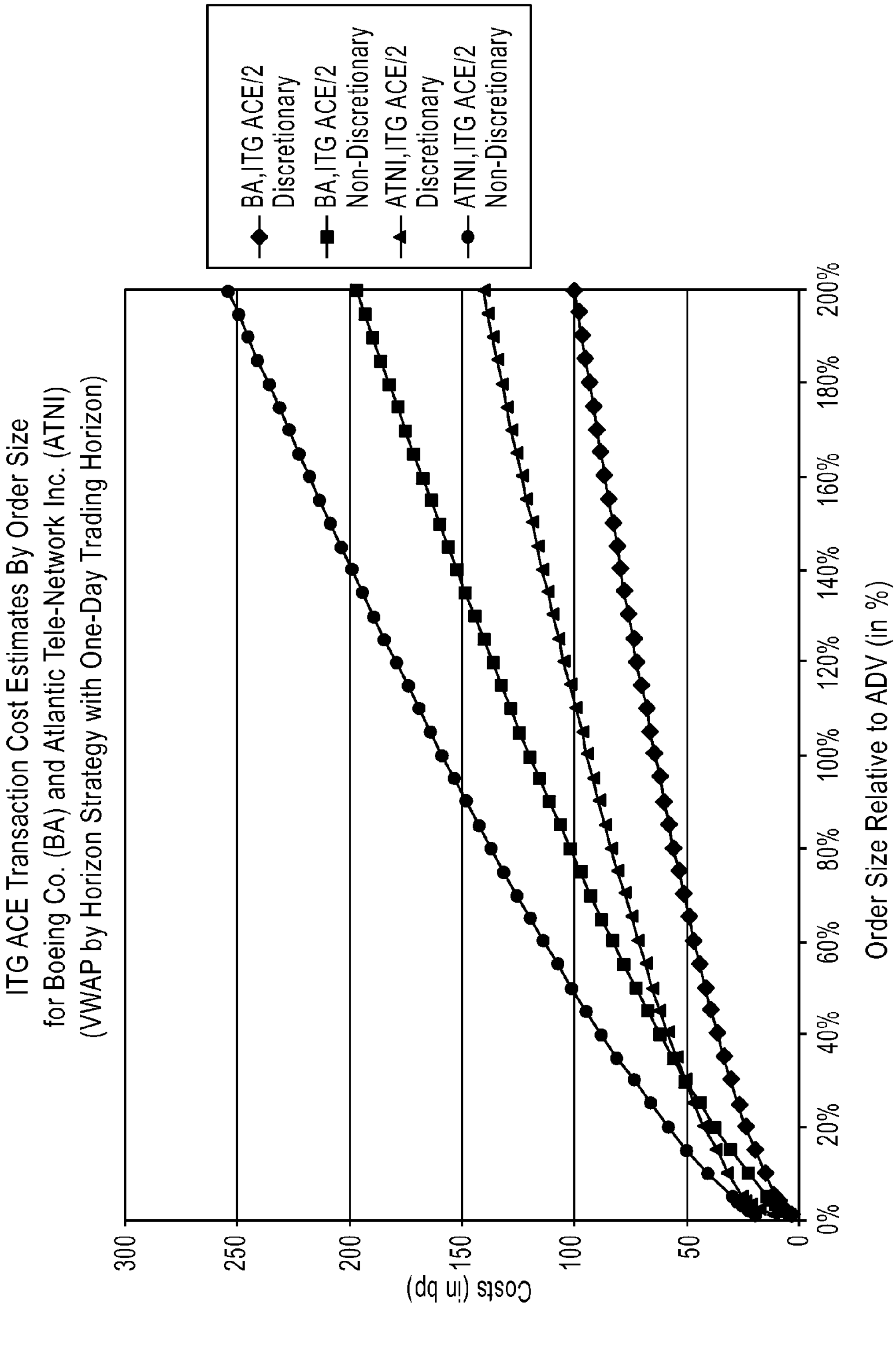
FIG. 22 is a graph illustrating estimated transaction costs.
Figure 23:
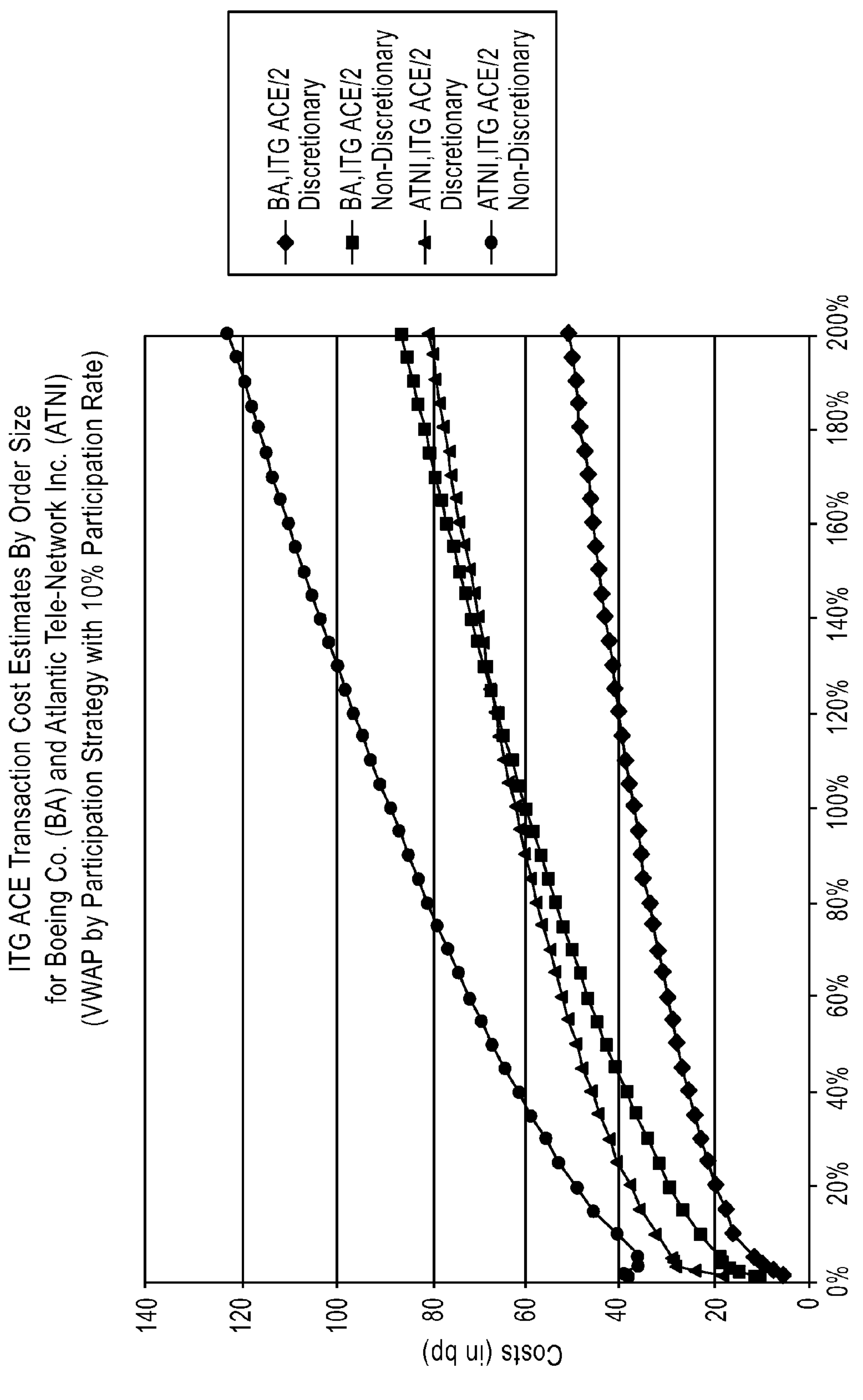
FIG. 23 is a graph illustrating estimated transaction costs.

FIG. 22 and FIG. 23 show the difference in cost estimates for Atlantic Tele-Network Inc. (ATNI) and Boeing Co. (BA) using ACE® Non-Discretionary and ACE® Discretionary for various order sizes. In FIG. 22, the cost estimates are based on a VWAP by Horizon Strategy with a one-day trading horizon. As expected, transaction costs for orders that need to be completed are higher than those that reflect a market average amount of opportunistic trading. In FIG. 23, the cost estimates are based on a VWAP By Participation Strategy with 10% participation rate. As a result, orders can span multiple days. Compared to FIG. 22, the cost estimates are higher for very small orders, but lower for larger orders. The one-day horizon in FIG. 22 forces the execution of an order into one day even if for larger sizes. This explains the higher costs in FIG. 22 for larger orders compared to FIG. 23. For very small orders, the logic works the other way around. Whereas the one-day horizon in FIG. 22 allows for the order to be spread over the entire day, the 10% participation rate in FIG. 23 forces the execution in the early half-hour intervals of the trading day. This leads to higher cost estimates for two reasons. First, the trading is concentrated in the early bins and at 10% participation rate may be much higher than the one-day horizon trading rate in FIG. 22. Second, spread costs are highest early in the morning (see FIG. 3), and thus the 10% participation strategy incurs those higher spread costs early in the morning. There is one more observation in FIG. 23 that needs explanation. For ATNI, the ACE® Non-Discretionary cost estimates are higher declining in order size for the very smallest order sizes. The explanation, again, is due to the fact, that for small orders, the 10% participation rate will imply full execution of the order in the early morning, thereby incurring the spread costs that are highest in the early morning. By increasing the order incrementally, cost estimates actually go down since the costs due to spread costs are declining as the order is spread more and more into the day outweighing any price impact costs that arise with larger order size. This effect subsides and the effect of larger price impact for larger orders takes over at a certain order size resulting in the usual increasing cost function. For ACE® Discretionary, this pattern is not observed since opportunistic traders may use limit orders and time their trading such that the spread costs do not have an impact on their costs and the lower costs of the opportunistic traders outweighs the effect from the non-opportunistic traders.

Generally, all buyer- (seller-) initiated orders are expected to be executed at the prevailing ask (bid) price. However, a trader may often achieve a better execution price and, therefore, realize a price improvement. Price improvement may appear simply because the market moved favorably during the time it took to route the order to the exchange, resulting in a lucky saving. But there are also other more sophisticated market microstructure theories why price improvement occurs. An excellent overview can be found in Rhodes-Kropf (2002). The discussion there is focused mostly on price improvement in dealership markets. Petersen and Fialkowski (1994) and Ready (1999) explain the existence of price improvement in auction type markets like the NYSE through hidden limit orders or stopped orders. For details about hidden limit orders and how to predict the volume executed against hidden limit orders for different market conditions, see e.g., Bongiovanni, Borkovec and Sinclair (2006).

The ACE® Price Improvement model allows users to quantify the price improvement of small size orders for different exchanges and values of order side, size, and liquidity. The model is based on ITG proprietary execution data for U.S. and the ITG PEER GROUP Database for international orders, respectively. These sources provide the necessary information to obtain market prices and to measure price improvement at any particular moment of trade execution. Not surprisingly, the results indicate that price improvement can be very different for quote- and order-driven stock markets.

Calculation of relative price improvement for different exchanges, trade sides, trade sizes, and groups of liquidity can be made the equation:

$$R = \delta \cdot \frac{(p_Q - p)}{(p_{ask} - p_{bid})}, \quad (5)$$

where p is the trade price, pbid and pask are the prevailing bid and ask quotes, respectively, pQ=pask and δ=1 for buys, pQ=pbid and δ=−1 for sells. Such a parameter has a very clear interpretation. For relatively small trades the value of R usually lies between 0 and 0.5. If a buy (sell) trade was executed at the ask (bid) price, R is equal to 0; i.e. there was no price improvement.

Figure 24:
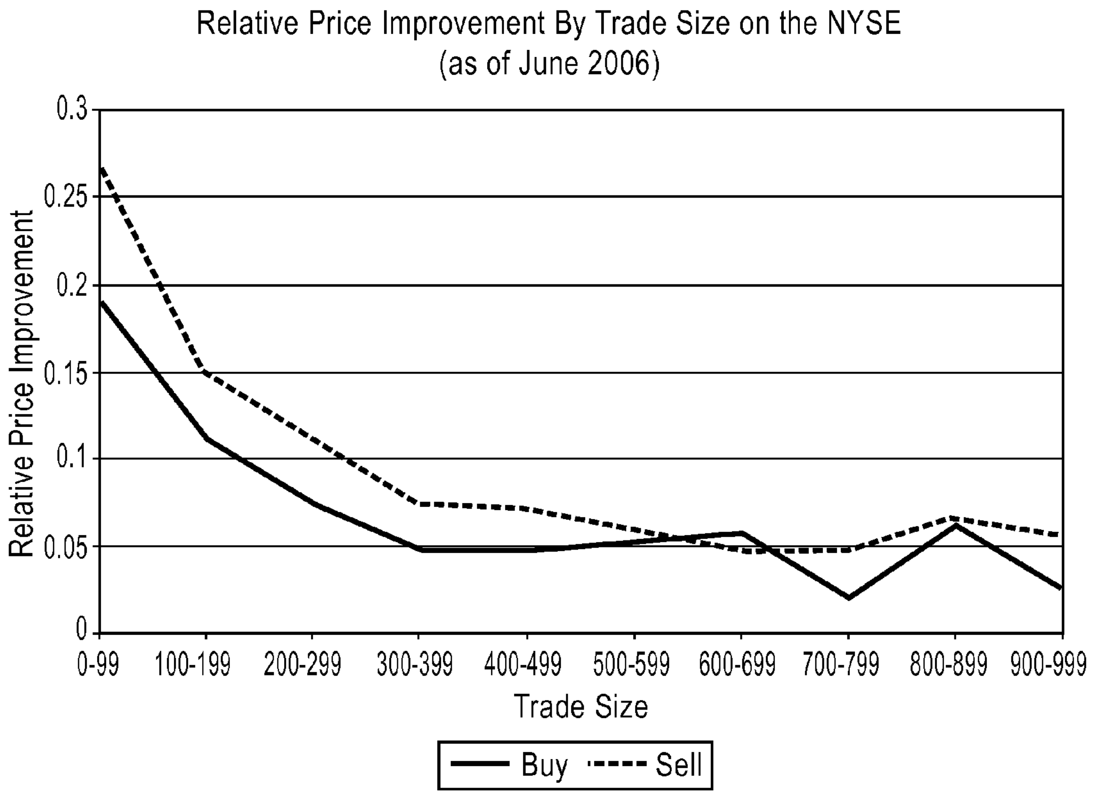
FIG. 24 is a graph illustrating relative price improvement.

FIG. 24 demonstrates that the average empirical relative price improvement for stocks traded on the NYSE depends on trade size and trade side. The graph is based ITG proprietary execution data for June 2006. Highest average relative price improvement occurs for the smallest trades and decreases as trade size increases.

FIG. 24 reports the average empirical relative price improvement for stocks traded on the NYSE depending on trade size and trade side. Relative price improvement is defined in Equation (5) of this document. It lies between 0 and 1, with 0 indicating no price improvement and 1 indicating an execution at the other side of the spread. The graph is based on ITG proprietary execution data for June, 2006. The highest average relative price improvement can be observed for orders in size of less than 100 shares. The larger the order size, the less average relative price improvement can be observed. On average, sell trades get more price improvement than buy trades.

Figure 25:
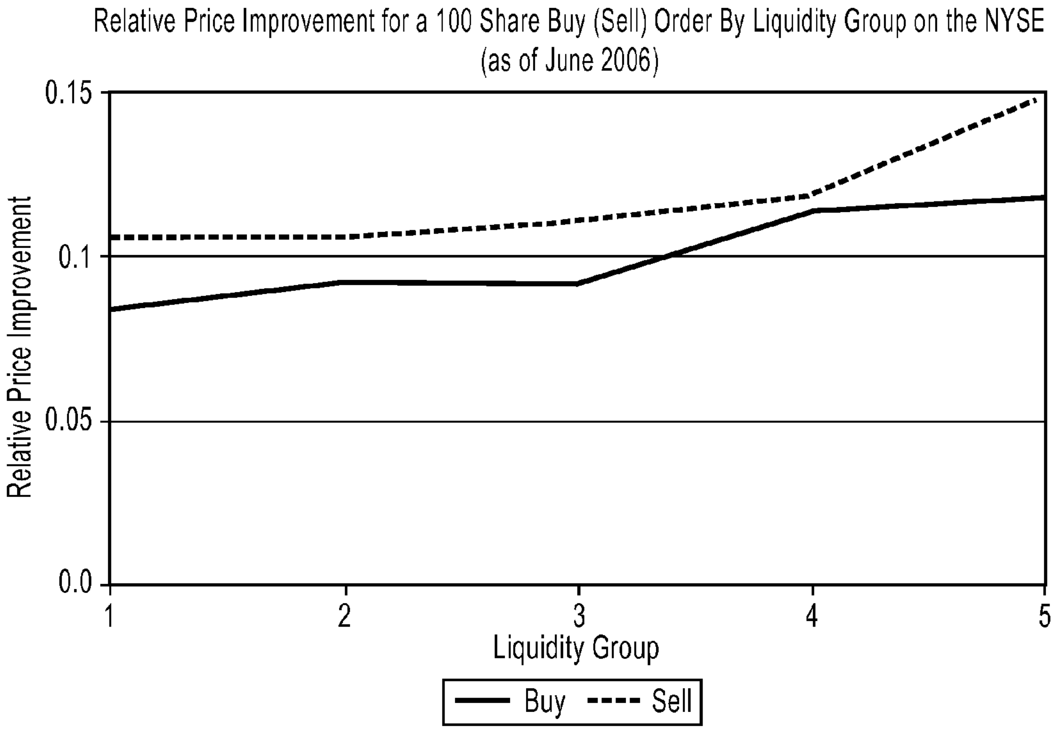
FIG. 25 is a graph illustrating relative price improvement.

FIG. 25 compares average empirical relative price improvement for stocks traded on the NYSE that belong to different liquidity groups. The plot shows that there is almost a linear relation between average relative price improvement and liquidity. Relative price improvement is the highest for the most liquid stocks and the lowest for the most illiquid stocks. However, note that price improvement in absolute terms can be still highest for illiquid stocks due to the generally much larger spread. Sell trades, on average, obtain more price improvement than buy trades.

As discussed in the previous sections, the execution of orders can be thought of as a trade-off between the risk of delayed execution and the cost of immediacy (see also, Hasbrouk and Schwartz (1988)). Much research has focused on the optimal execution of orders under various assumptions. Various forms of market impact models have been considered by practitioners, using theoretical or empirical methods to develop a set of market impact functions, both temporary and permanent (e.g., ACE/1, ACE/2, Kissell and Glantz (2003), or Almgren et al. (2003)). A common feature of these approaches is the assumption that the uncertainty in transaction costs can be represented entirely by the volatility of the security's return. The implication of this assumption is that there is no interplay between trading activity and a security's return volatility. This requires that the market in the security is near equilibrium during trading, that is, the security's return volatility remains constant while the return itself is affected by the market impact due to the trading. The assumption of independence of the moments of the return distribution and trading seems unrealistic. Almgren (2003) makes some important advances in the study of the interaction between trading activity and observed volatility. He derives optimal execution strategies for cases where volatility increases linearly with trading rate. ACE® takes a different approach, rather than modeling a security's return volatility conditional on trading, ACE® models the uncertainty in transaction costs directly as discussed in what follows.

Typically, a portfolio manager will construct a portfolio on the basis of net returns (i.e., gross alpha less transaction costs). Such a model provides not only expected transaction costs, but also an uncertainty measure associated with it. Often, a moderately volatile stock will exhibit uncertainty of equal or even much greater magnitude than the expected costs, so a good measure of the uncertainty in transaction costs resulting from the security's return volatility under liquidity pressure is crucial to an accurate transaction cost model. When analyzing ex-post trading performance, this same uncertainty about transaction cost estimates is used to determine the quality of execution. A trading desk manager may ask: "Did 67% of trading costs fall within one standard deviation of the expected trading costs?" Basing the answer to this question on a security's return volatility estimates, rather than the actual expected distribution of transaction costs will be misleading due to the described dependence between return volatility and trading.

A second concern is that most previous work on optimal trade execution has assumed constant, normal distributions of security returns during trading. We have shown that a large cross-section of actual executions[1] exhibit fat tails and skewness not accurately described by a normal distribution. Instead, we find that the distribution of transaction costs can be accurately modeled with an asymmetric generalized t-distribution. The generalized t-distribution was introduced by McDonald and Newey (1988) and the skewed extension of it was proposed by Theodossiou (1998). The family of asymmetric generalized t-distributions is very flexible and includes five parameters: two parameters p and q define the general shape of the distribution (FIG. 49 illustrates some examples of generalized t-distributions with different choices of p and q), one parameter $\alpha$ defines the asymmetry of the distribution and the final two parameters are location and scale parameters that determine the mean and variance of the distribution. The generalized asymmetric t-distribution contains many families of distributions, amongst them are the normal distributions ($p=2$ and $q\to\infty$) and the Student's t-distributions ($p=2$ and $q=2\beta$, where $\beta$ denotes the degree of freedom of the Student t-distribution).

[1] From ITG's Peer Group Database.

Figure 26:
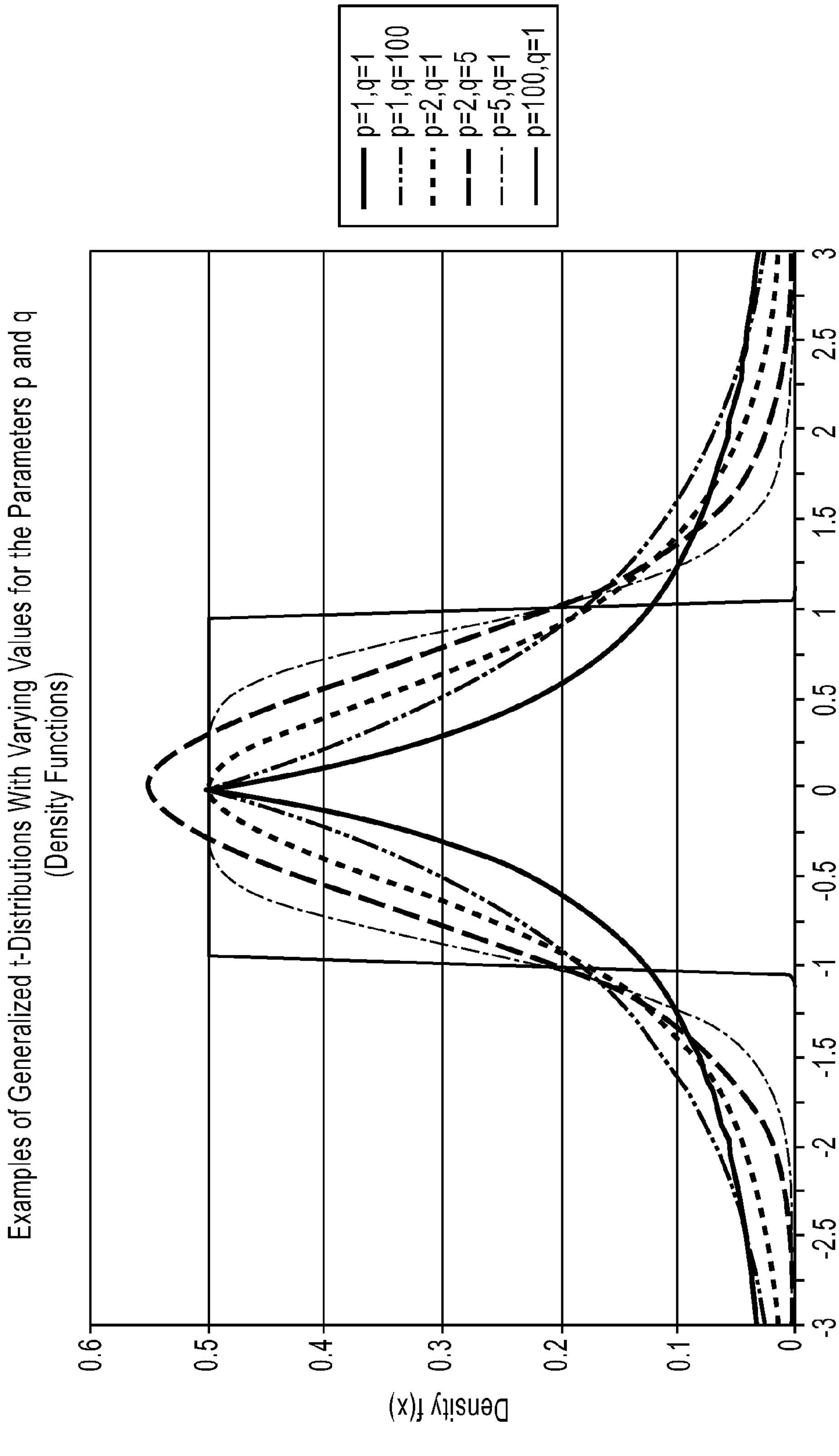
FIG. 26 is a graph illustrating generalized t-distributions.

FIG. 26 illustrates different generalized t-distributions given the choice of the parameters p and q. It is well-known that one can obtain the regular Student's t-distribution by setting $p=2$. As a consequence, $p=2$ and $q\to\infty$ yield the normal distribution.

The ACE® transaction cost distributions are generalized asymmetric t-distributions with fixed, order-independent coefficients p, q, and $\alpha$ while the location and scale parameters reflect the expected cost of the order and the security's return standard deviation over the trading horizon adjusted by the order size relative to the security's ADV. The adjustment is in line with Almgren (2003) and empirical evidence that predicted standard deviations of transaction costs solely based on the security's return are lower than the empirical standard deviations. The adjustment of the standard deviation and the shape and asymmetry coefficients are derived from ITG PEER GROUP data similarly as described in Arellano-Valle et al. (2004).

Figure 27:
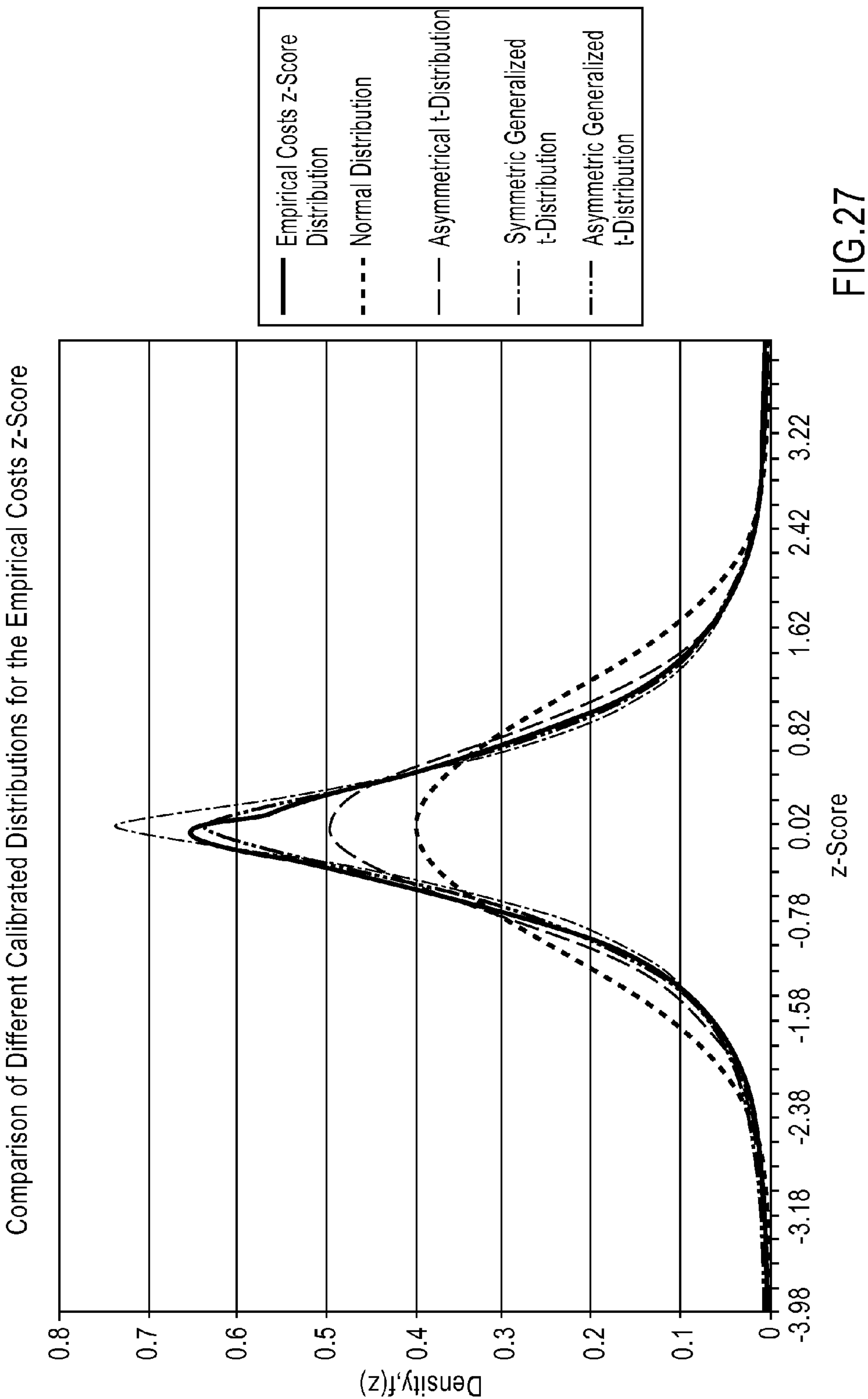
FIG. 27 is a graph illustrating different calibrated distributions.

FIG. 27 presents the fit of the empirical distribution of the z-scores of all actual costs with the ACE® z-score distribution (determined by the three parameters p, q and $\alpha$). For illustration purpose we have added some other calibrated theoretical distributions. Clearly, the generalized t-distribution outperforms all other distributions. Statistical techniques such as the Kolmogorov-Smirnoff test confirm this fact.

FIG. 27 compares the aggregated distribution of the z-scores of actual peer group database costs with four different calibrated distributions: the normal distribution, the asymmetric t-distribution, the symmetric generalized t-distribution and the asymmetric generalized t-distribution. Both the normal and the asymmetric t-distribution do not fit the empirical distribution well. The asymmetric generalize t-distribution captures all the observed properties. It is heavy-tailed, leptokurtic and asymmetric (the median is smaller than the mean).

In summary, the ACE® cost distributions are characterized by three fixed parameters, the expected transaction costs and the standard deviation of the transaction costs. However, since the cost distributions are not normal distributions, one needs to use care when constructing confidence intervals based on mean and standard deviation. The usual interpretation that mean+/−one standard deviation contains two thirds of the observation no longer applies. Consequently, it is beneficial to also look at percentiles of the distribution. The percentiles of the cost distribution for a given scenario are part of the output of ACE®.

As for any model, the key question for ACE® is how well the model actually performs. The accuracy of the model is controlled and validated through a process of calibration and statistical testing. The goal of calibration is to tune the price impact coefficients derived from market tick-data to achieve an alignment with realized transaction costs from a large database of known orders. Statistical testing is used to ensure that the model is returning unbiased results (i.e., costs that are not systematically over- or underestimated.)

Each quarter, ACE® is calibrated to ITG's Peer Group Database. A moving two-year span of data is used, comprised of (as of December 2007) approximately seven trillion U.S. dollars in trades from over 140 large investment management firms. For more information about the underlying data see FIG. 53 for the most important countries of the ACE® universe.

FIG. 28 reports descriptive statistics of the data for the calibration/testing of the ACE® model for some of the markets in the ACE® universe. The statistics are based on the time period from January 2004 to December 2006. Reported are the number of executions, the number of clusters (or order decisions), the volume of the executions in local currency, the number of stocks executions are recorded for, and the number of clients in ITG's Peer Group Database. The countries are sorted by decreasing number of executions.

Establishing a suitable data set for calibration and testing is a difficult endeavor for several reasons. Firstly, execution data often do not contain as much detailed information as desirable. For example, execution and decision times might be missing or there is no clear declaration if the underlying order was a market or a limit order. Secondly, transaction costs depend on execution strategies and these strategies are, in most cases, not formalized by traders and certainly not recorded. Due to numerous factors (e.g., market conditions, work load, explicit instructions from portfolio managers) it is very likely that traders execute similar trades very differently over the course of a year.

Finally, an additional challenge exists in finding an approach to discount significant market and/or stock-specific movements, allowing for the measurement of the pure unperturbed magnitude of transaction costs. To this end, ITG carefully establishes a methodology that reflects the needs of the calibration and testing processes, while being sensitive to challenges presented by the data.

Since investment managers' orders are often broken into smaller orders or trades, an aggregation must be performed before arriving at a basic order unit suitable for analyzing trading activity, its effect on prices and, thus, comparison with ACE® average cost estimates. To perform this aggregation, trade packages (ex-ante orders) are created that correspond to groups of trades where the same investment manager is in the market for a stock (buying or selling) over a sustained period of time.

The clusterization concept is in line with academic literature (see e.g., Chan and Lakonishok (1995)) as well as industry practice. The entire sequence of trades (ex-ante order) is treated as the basic unit of analysis in order to determine price impact and execution costs of institutional trading. In particular, a "buy ex-ante order" is defined to include the manager's successive purchases of the stock. The order ends when (a) the manager stays out of the market for at least one day,
(b) the manager does not execute more than 2% of ADV,
(c) there are no other trades that have been placed as an order within the execution horizon of the package.

"Sell ex ante orders" are defined analogously. For each ex-ante order, the trading aggressiveness (participation rate) and the average execution price is determined. Since execution time stamps are generally not reported, it is assumed that each ex-ante order has been executed according to a VWAP strategy with the empirically estimated participation rate. In most cases, this assumption is reasonable since large institutions are often measured against the VWAP benchmark.

The transaction costs per share are defined as the difference between the average execution price and the opening price of the order placement date (the benchmark price). The sign (positive or negative) of the difference is used so that a positive value represented a bad outcome. For each ex-ante order in the data set, the realized transaction costs are computed. Also calculated, using the parameters of the ACE® model and the actual trading strategy for each order, are the estimated expected transaction costs. This enables a one-to-one comparison between actual and estimated transaction costs.

For model calibration and testing, average actual costs and ACE® estimates are computed for the data set, segmented by size relative to ADV, by exchange, and by liquidity group. More specifically, for a given exchange and liquidity group, orders are subdivided into the following different size categories: 0-1%, 1-2%, 2-3%, . . . , 98-99%, 99-100%.

A two-step regression approach can be applied to ensure that average actual costs and ACE® cost estimates coincide. Loosely speaking, the calibration procedure adjusts the price impact coefficients in such a way that the average ACE® cost estimates fit to the actual average costs. The adjustment is applied uniformly across all bins in order to avoid destroying the intra-day relationship of the price impact coefficients. As a consequence, low actual average costs will imply low price impact coefficients and therefore low ACE® cost estimates. FIGS. 29 to 34 serve as examples for the goodness-of-fit of empirical cost curves from the ITG PEER GROUP Database and the calibrated ACE® model.

Figure 29:
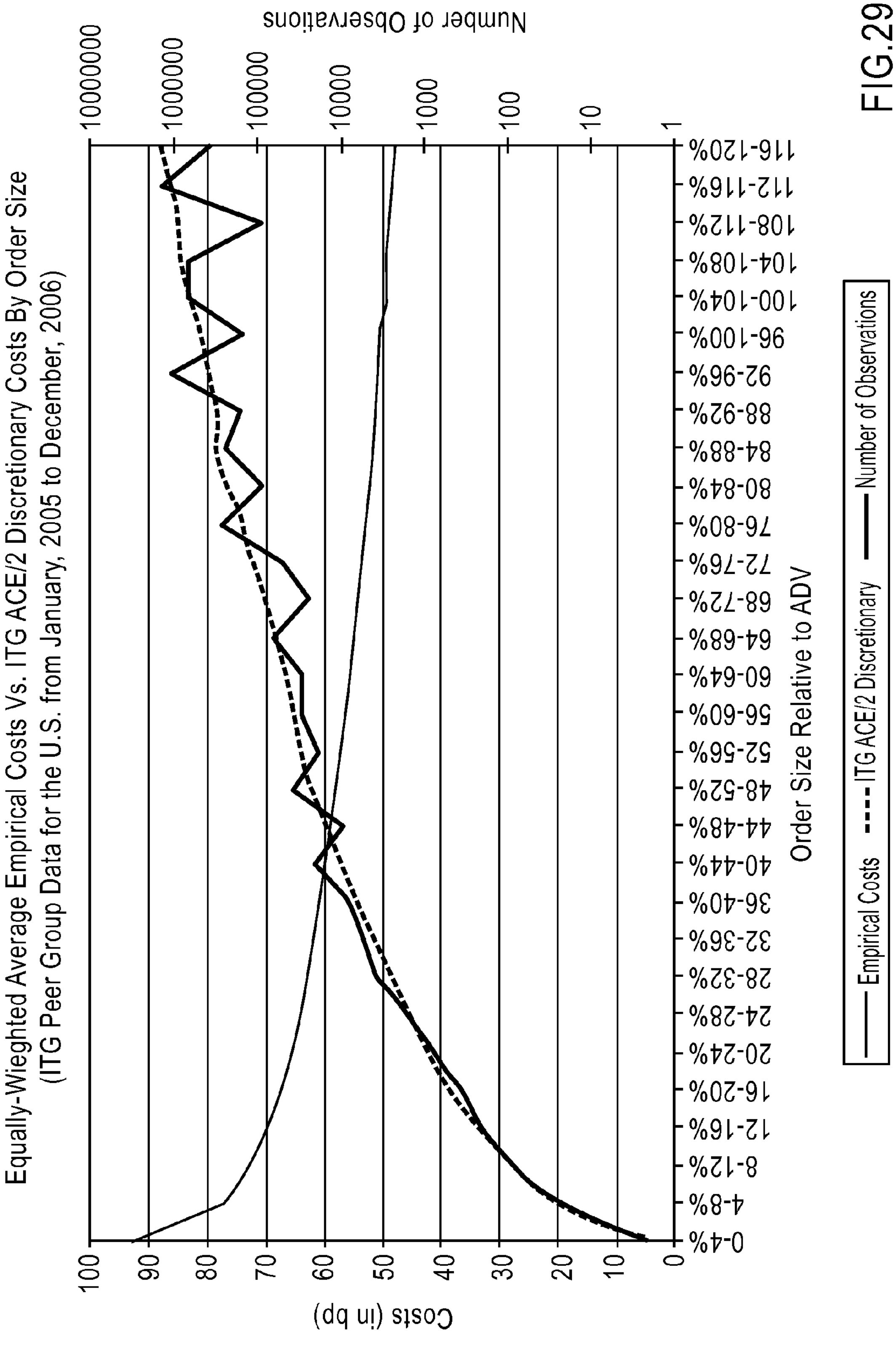
FIG. 29 is a graph illustrating a comparison of estimated versus discretionary costs.
Figure 30:
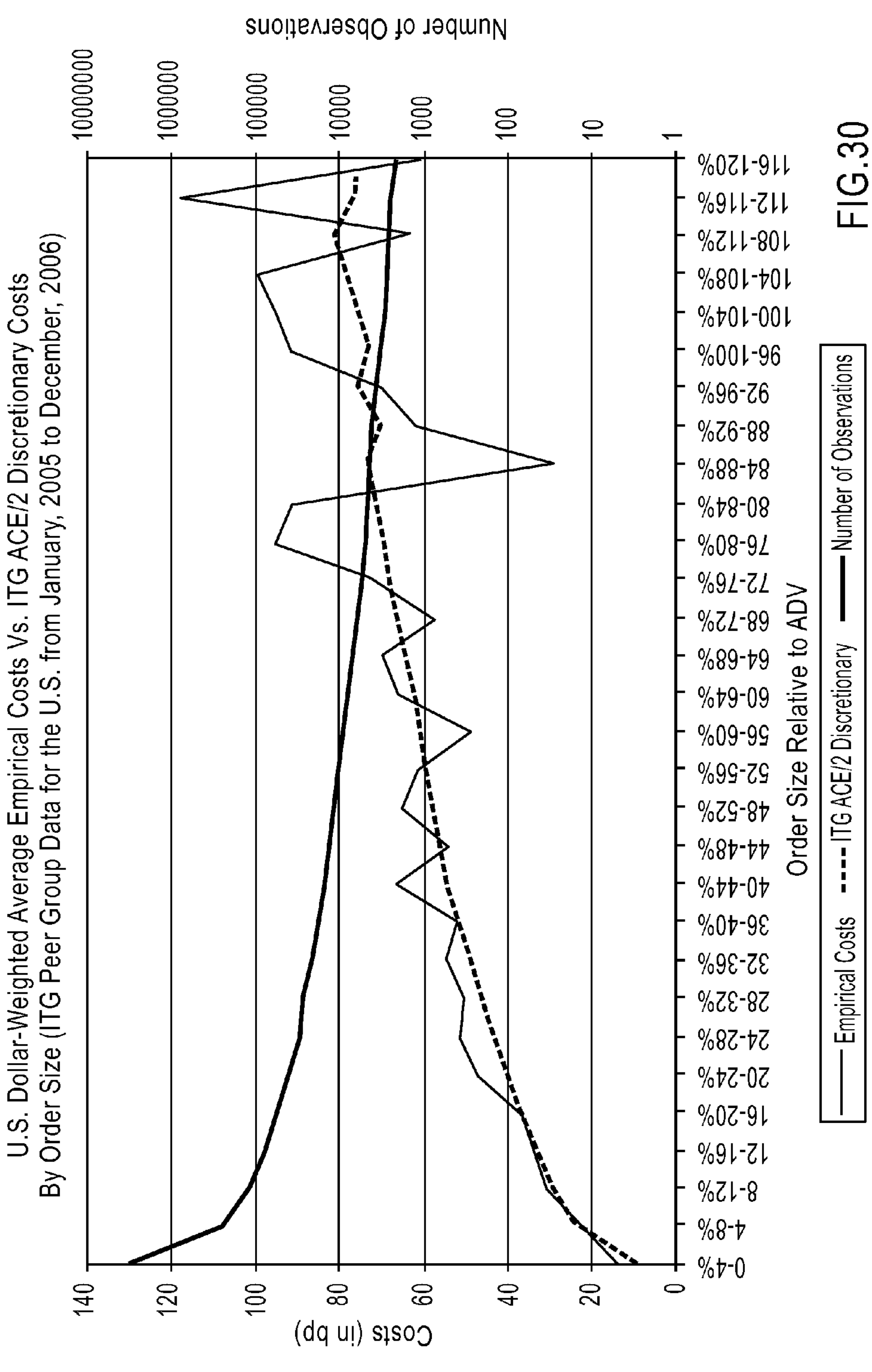
FIG. 30 is a graph illustrating a comparison of estimated versus non-discretionary costs.

FIGS. 29 and 30 show equally- and dollar-weighted average empirical costs and ACE/2 Discretionary cost estimates for different order sizes for all U.S. trades in the ITG PEER GROUP Database from January 2005 to December 2006. The charts demonstrate a very good fit for the ACE/2 Discretionary model. Similar fits can be observed for all other ACE/2 countries and are available upon request.

Figure 31:
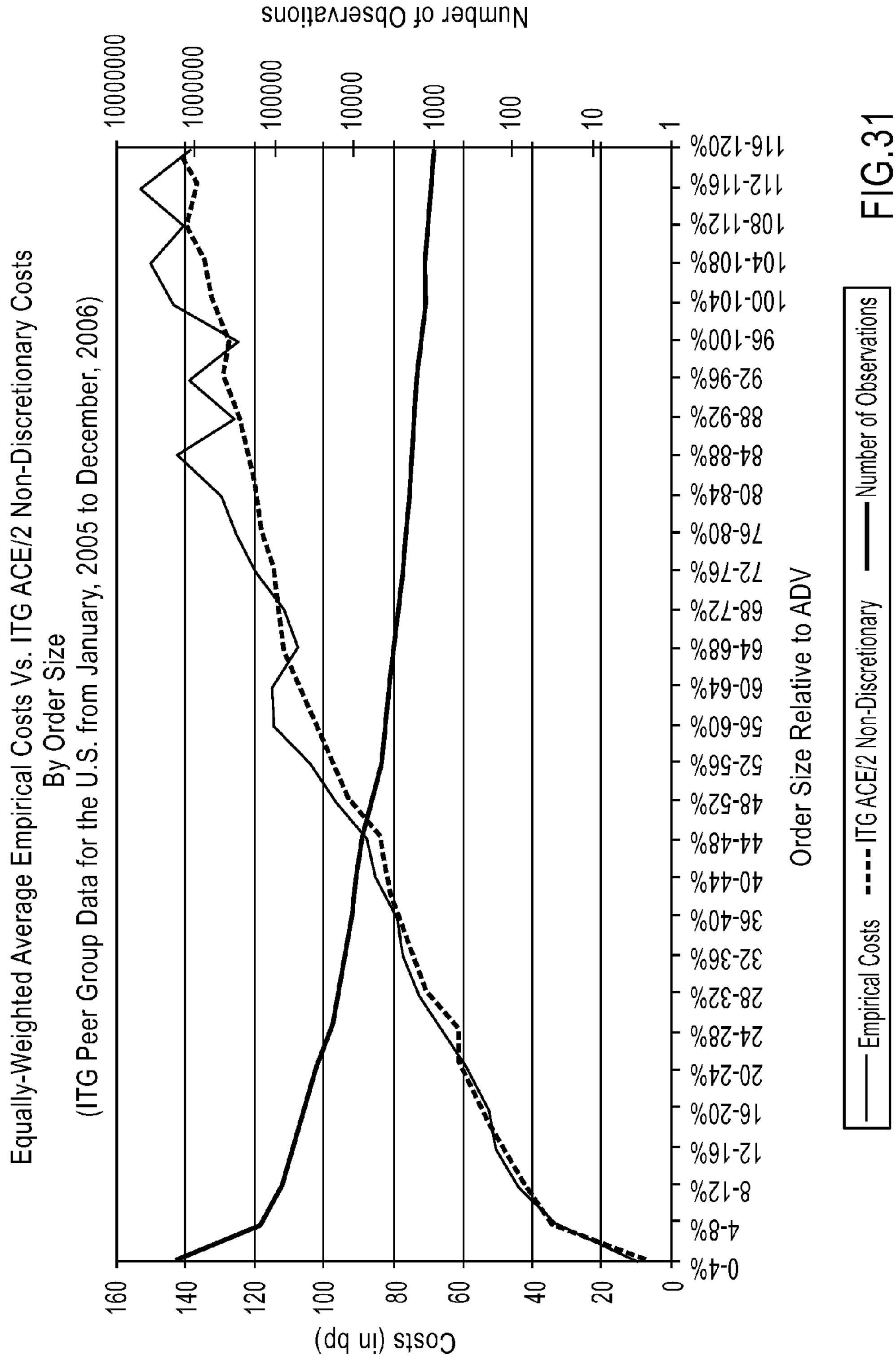
FIG. 31 is a graph illustrating a comparison of estimated versus non-discretionary costs.
Figure 32:
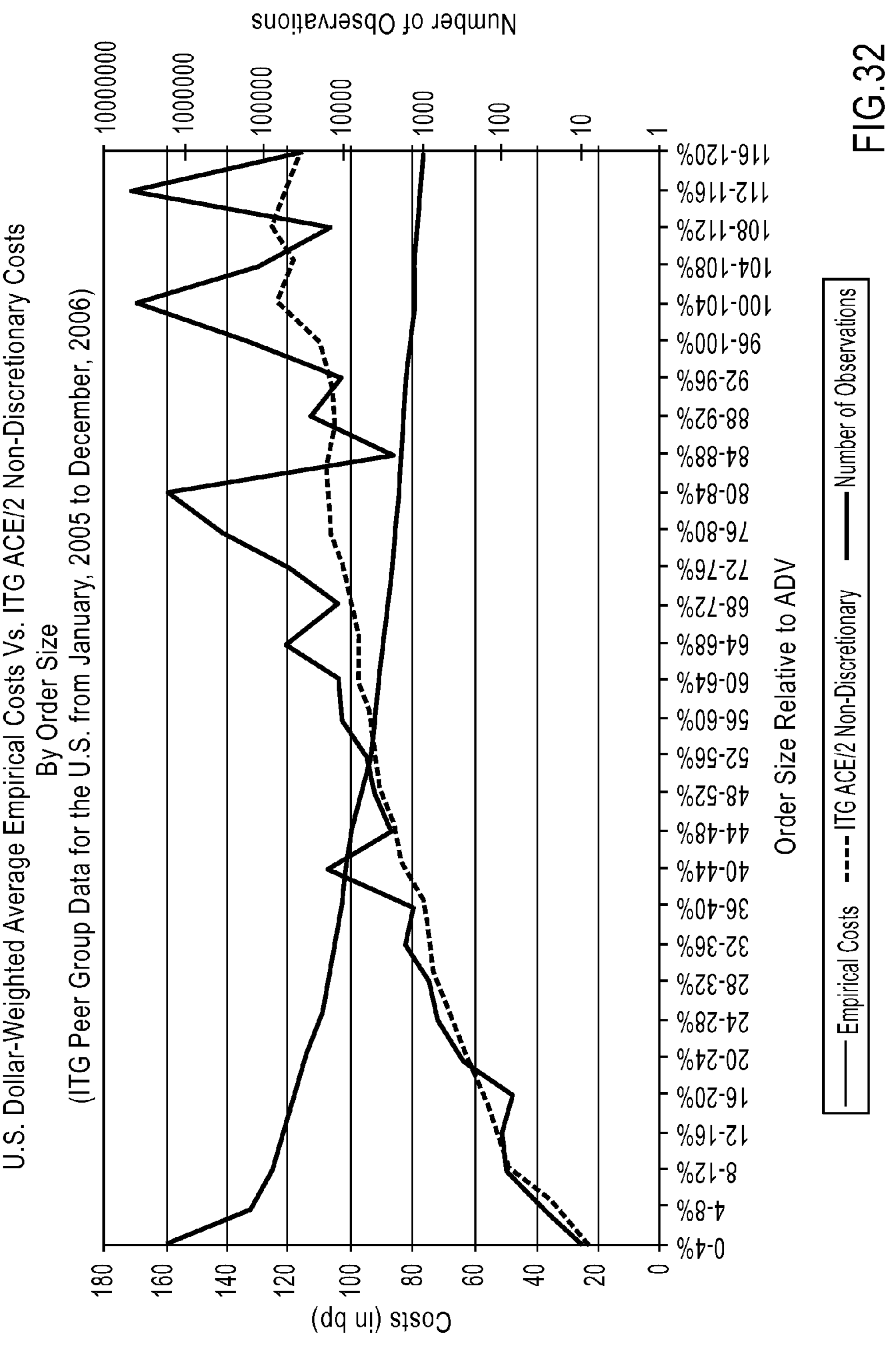
FIG. 32 is a graph illustrating a comparison of estimated versus non-discretionary costs.
Figure 33:
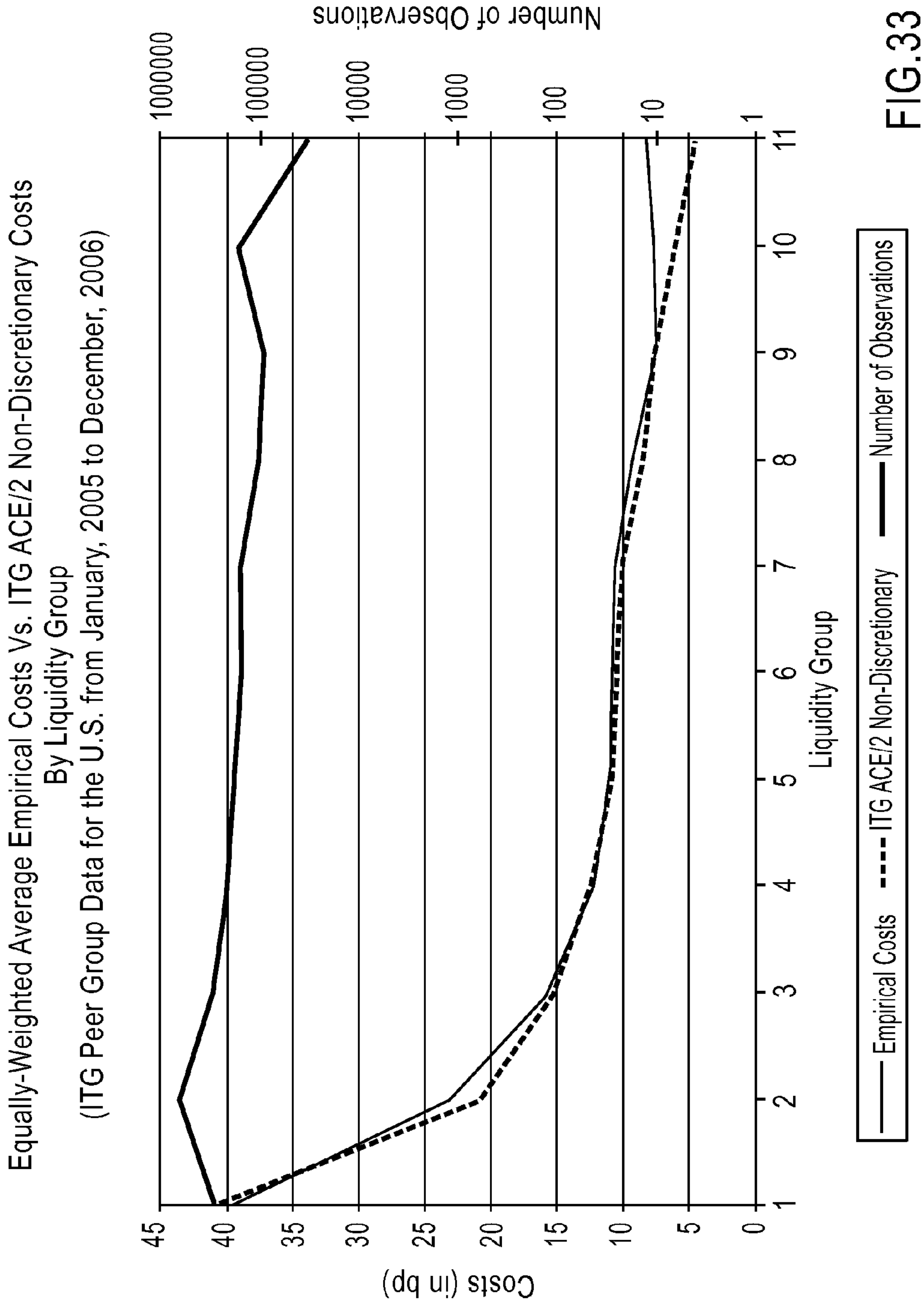
FIG. 33 is a graph illustrating a comparison of estimated versus non-discretionary costs.
Figure 34:
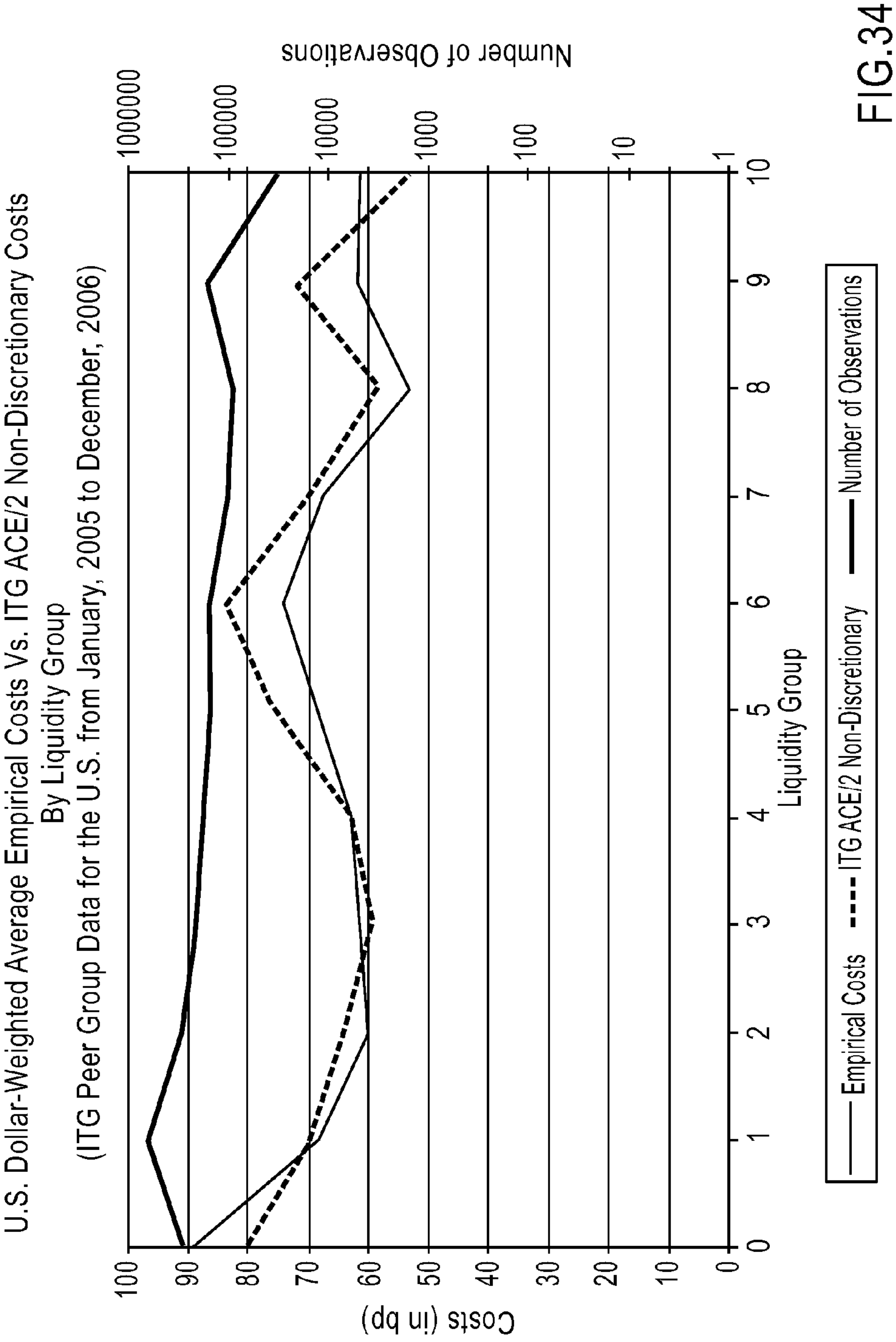
FIG. 34 is a table reporting descriptive statistics of the data for the calibration/testing of the ACE® model.

FIG. 31 FIG. 32 show equally- and dollar-weighted average empirical costs and ACE/2 Non-Discretionary cost estimates for different order sizes for all U.S. trades in the ITG PEER GROUP Database from January 2005 to December 2006. The charts demonstrate a very good fit for the ACE/2 Non-Discretionary model. Similar fits can be observed for all other ACE/2 countries and are available upon request.

REFERENCES

The following publications were referenced throughout the document above. The content of these publications are incorporated herein by reference for the purpose as used.

Almgren, R. (2003) Optimal execution with nonlinear impact functions and trading-enhanced risk, *Applied Mathematical Finance,* 10, 1-18.

Almgren, R. and Chriss, N. (2000) Optimal execution of portfolio transactions, *Journal of Risk,* 3, Winter 2000/2001, 5-39.

Almgren, R., Thum, Ch., Hauptmann, E. And Li, H. (2003) Direct estimation of equity market impact, http://www-.courant.nyu.edu/~almgren/papers/costestim.pdf.

Arellano-Valle, R. and Gómez, H. and Quintana, F. (2004). A New Class of Skew-Normal Distributions, *Communications in Statistics, Series A,* 33, 1465-1480.

Barclay, M. J. and Warner, J. B. (1993) Stealth trading and volatility, *Journal of Financial Economics,* 34, 281-305.

Berkowitz, S., Logue, D. and Noser E. (1988) The total cost of transactions on the NYSE, *Journal of Finance,* 41, 97-112.

Bertsimas, D. and Lo, A. W. (1998) Optimal control of execution costs, *Journal of Financial Markets,* 1, 1-50.

Bongiovanni, S., Borkovec, M. and Sinclair, R. (2006) Let's play hide-and-seek: the location and size of undisclosed limit order volume, *Journal of Trading*, Summer 2006, 34-46.

Borkovec, M. and Heidle, H. (2007) The magic of hindsight: creating a post-trade transaction cost estimate based on realized market conditions, *ITG Inc. Research Report.*

Breen, W. J., Hodrick, L. S. and Korajczyk, R. A. (2002) Predicting equity liquidity, *Management Science*, INFORMS, 48, 470-483.

Burghart, G., Hanweck, J. and Lei, L. (2006) Measuring Market Impact and Liquidity, *Journal of Trading, Fall* 2006, 70-84.

Chakravarty, S., Panchapagesan, V. and Wood R. A. (2002) Did decimalization hurt institutional investors? *Journal of Financial Markets,* 4, 400-420.

Chan, L. K. C. and Lakonishok, J. (1993) Institutional trades and intraday stock price behavior, *Journal of Financial Economics,* 33, 173-199.

Chan, L. K. C. and Lakonishok, J. (1995) The behavior of stock prices around institutional trades, *Journal of Finance,* 50, 1147-1174.

Chan, K., Christie, W. and Schultz, P. (1995a) Market structure and the intraday pattern of bid-ask spreads for Nasdaq securities, *Journal of Business,* 68, 35-60.

Chan, K., Chung, P. and Johnson, H. (1995b) The intraday behavior of bid-ask spreads for NYSE stocks and CBOE options, *Journal of Financial and Quantitative Analysis*, 30, 329-346.

Chen, Z., Stanzl, W. and Watanabe, M. (2002) Price impact costs and the limit of arbitrage, http://students.som.yale.edu/Phd/mw239/research/Price_Impact.pdf Chung, K. H. and Van Ness, R. A. (2001) Order handling rules, tick size, and the intraday pattern of bid-ask spreads for Nasdaq stocks, *Journal of Financial Markets,* 4, 143-161.

De Jong, F., Nijman, T. E. and Roell, A. (1995) A comparison of the cost of trading French shares on the Paris Bourse and on SEAQ International, *European Economic Review,* 39, 1277-1301.

diBartolomeo, D. (2006) Building a better bear trap—new concepts in cost and impact modeling, *Journal of Automated and Algorithmic Trading*, July 2006, 18-21

Domowitz, I., Glen, J. and Madhavan, A. (2002) Liquidity, volatility and equity trading costs across countries and over time, *International Finance,* 4, 221-256.

Domowitz, I. and Yegerman, H. (2005) Measuring and interpreting the performance of broker algorithms, *ITG Inc. Research Report.*

Farmer, J. D. (2002) Market force, ecology, and evolution, *Industrial and Corporate Change,* 11, 895-953.

Foster, F. D. and Viswanathan, S. (1993) The effect of public information and competition on trading volume and price volatility, *Review of Financial Studies,* 6, 23-56.

Harris, L. (1986) How to profit from intradaily stock returns, *Journal of Portfolio Management,* 2, 61-65.

Hasbrouck, J. and Schwartz, R. A. (1988) Liquidity and execution costs in equity markets, *Journal of Portfolio Management,* 14, 10-17.

Hasbrouck, J. (1991a) Measuring the information content of stock trades, *Journal of Finance,* 66, 179-207.

Hasbrouck, J. (1991b) The summary informativeness of stock trades: an econometric analysis, *Review of Financial Studies,* 4, 571-595.

Hasbrouck, J. and Seppi, D. J. (2001) Common Factors in Prices, Order Flows and Liquidity, *Journal of Financial Economics,* 59, 383-411.

Hausman, J. A., Lo, A. W. and McKinlay, A. C. (1992) An ordered probit analysis of transaction stock prices, *Journal of Financial Economics,* 31, 319-379.

Huberman, G. and Stanzl, W. (2005) Optimal liquidity trading, *Review of Finance,* 9, No. 2, 165-200.

ITG Inc. (2007) Intraday parameter distributions for world equity markets, ITG Financial Engineering, *Technical Report.*

ITG Inc. (2007) ITG Risk Models—Version 3, *ITG Inc. White Paper.*

Jain, P. and Joh, G.-H. (1988) The dependence between hourly prices and daily volume, *Journal of Financial and Quantitative Analysis*, 23, 269-284.

Karpoff, J. M. (1988) Costly short sales and the correlation of returns with volume, *Journal of Financial Research,* 11, 173-188.

Keim, D. B. and Madhavan, A. (1996) The upstairs market for large-block transactions: analysis and measurement of price effects, *Review of Financial Studies,* 9, 1-36.

Kempf, A. and Korn, O. (1999) Market depth and order size, *Journal of Financial Markets,* 2, 29-48.

Kissell, R. and Glantz, M. (2003) Optimal trading strategies: quantitative approaches for managing market impact and trading risk, *American Management Association.*

Kyle, A. S. (1985) Continuous auctions and insider trading, *Econometrica,* 53, 1315-1336.

Lee, C., Mucklow, B. and Ready, M. (1993) Spreads, depths and the impact of earnings information: an intraday analysis, *Review of Financial Studies,* 6, 345-374.

Lert, P. (2001) Methods of Measuring Transaction Costs, *Investment Guides, Spring* 2001.

Lo, A. and MacKinlay (1988) Stock market prices do not follow random walks: evidence from a simple specification test, *Review of Financial Studies,* 1, 203-238.

Madhavan, A. and Smidt, S. (1991) A Bayesian model of inraday specialist pricing, *Journal of Financial Economics,* 30, 99-134.

Madhavan, A. (2002) VWAP Strategies, *Investment Guides, Spring* 2002.

McDonald, J. B. and Newey, W. K. (1988) Partially adaptive estimation of regression models via the generalized t distribution, Econometric Theory, 4, 428-457.

McInish, T. and Wood, R. (1992) An analysis of intraday patterns in bid/ask spreads for NYSE stocks, *Journal of Finance,* 47, 753-764.

Munck, N. H. (2006) When Transactions Went High-Tech: A Cross-Sectional Study of Equity Trading Costs in Light of More Sophisticated Trading Systems, *Journal of Trading, Fall* 2006, 90-103.

Perold, A. (1988) The Implementation Shortfall: Paper versus Reality, *Journal of Portfolio Management,* 14, 4-9.

Petersen, M. and Fialkowski, D. (1994) Posted versus effective spreads: good prices or bad quotes, *Journal of Financial Economics,* 35, 269-292.

Ready, M. J. (1999) The specialist's discretion: stopped orders and price improvement, *Review of Financial Studies,* 12, 1075-1112.

Rhodes-Kropf, M. (2005) Price improvement in dealership markets, *Journal of Business,* 78, 1137-1172.

Schwartz, R. A. and Steil, B. (2002) Controlling institutional trading costs: we have met the enemy and it is us, *Journal of Portfolio Management,* 28, 39-49.

Seppi, D. J. (1990) Equilibrium block trading and asymmetric information, *Journal of Finance,* 45, 73-94.

Spierdijk, L., Nijman, T. E., van Soest, A. H. O. (2004) Price dynamics and trading volume: a semiparametric approach, http:/papers.ssrn.com/sol3/papers.cfm?abstract_id=512342.

Teitelbaum, R. (2003) Know a Fund's Cost? Look Deeper, *The New York Times Company*, Feb. 9, 2003.

Theodossiou, P. (1998) Financial Data and the Skewed Generalized T Distribution, *Management Science,* 44, 1650-1661.

"Transaction Costs—A Cutting-Edge Guide to Best Execution" (2001) *Investment Guides*, Spring 2001, edited by Brian R. Bruce, Institutional Investor Inc.

"Transaction Performance—The Changing Face of Trading" (2002) *Investment Guides*, Spring 2002, edited by Brian R. Bruce, Institutional Investor Inc.

Yang, J. and Jiu, B. (2006) Algorithm selection: a quantitative approach, *Algorithmic Trading II*, edited by Brian R. Bruce, Institutional Investor Inc.

Zhang, Y. (1999) Toward a theory of marginally efficient markets, *Physica A,* 269, 30-44.

Systems, processes, and components described in this document may be implemented using one or more general purpose computers, microprocessors, or the like programmed according to the teachings of the present specification, as will be appreciated by those skilled in the relevant art(s). Appropriate software may be available that may be customized or used off-the-shelf to perform one or more aspects of the present invention. Further, aspects of the present invention can be implemented with one or more computer program modules developed by skilled programmers in readily available computer languages such as C++, PHP, HTML, XML, etc., based on the teachings of the present disclosure, as will be apparent to those skilled in the relevant art(s).

Similarly, one skilled in the art will understand that the present invention may be embodied in numerous configurations, including different computer architectures, such as centralized or distributed architectures.

One or more aspects of the present invention may includes a computer-based product, which may be hosted on a storage medium and include executable code for performing one or more steps of the invention. Such storage mediums can include, but are not limited to, computer disks including floppy or optical disks or diskettes, CDROMs, magneto-optical disks, ROMs, RAMs, EPROMs, EEPROMs, flash memory, magnetic or optical cards, or any type of media suitable for storing electronic instructions, either locally or remotely.

While this invention has been described in conjunction with specific embodiments thereof, many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein.

We claim:

1. A computer-implemented method for estimating transaction costs of a security trade execution according to a trading strategy selected by a user, comprising the steps of:

receiving over a network, data defining parameters of a proposed trade execution from a user, and data specifying a user-selected trading strategy, said trading strategy data including a sequence of share quantities of securities to be traded per time interval for a given trading horizon;

calculating, using a computer, first estimated transaction costs for the received proposed trade execution based on the user-selected trading strategy and market data using a first agency cost estimation model that considers discretionary and non-discretionary trades;

calculating, using a computer, second estimated transaction costs for the received proposed trade execution based on the user-selected trading strategy and market data using a second agency cost estimation model that considers only non-discretionary trades; and displaying to the user at least one of the first and second estimated transaction costs;

wherein, said user-selected trading strategy is selected from among a plurality of predefined trading styles, or specifically defined by said user.

2. The method of claim 1, wherein the method further comprises steps for generating recommendations for optimizing the user-selected trading strategy based on at least one of the first and second estimated transaction costs and providing said recommendations to the user over the network.

3. The method of claim 1, wherein an adjustment factor adjusts for trade difficulty and market conditions to allow for an accurate comparison of trades performed under different circumstances and trading conditions.

4. The method of claim 3, wherein said adjustment factor provides an expected trading cost for each security for each day based on a statistical analysis of measures of trade difficulty.

5. The method of claim 2, further comprising a step of receiving a risk aversion profile and hypothetical trade order characteristics through the network and wherein said step of calculating second estimated transaction costs factors said risk aversion profile and hypothetical trade order characteristics.

6. The method of claim 1, comprising the further step of:

providing a user interface to allow a user to identify relevant data and trends in a dataset, and to locate factors that affect transaction performance.

7. The method of claim 6, wherein a user is able to change a subset of the dataset under consideration and perform real-time analytic calculations without additional pre-processing.

8. The method of claim 6, wherein a user may add new user aggregates, without additional pre-processing.

9. The method of claim 1, wherein the server is adapted to provide a direct interface to a securities price database to enable the display of transaction cost analysis results in real-time.

10. The method of claim 1, wherein a transaction cost algorithm allows for intra-day calculation of price-based benchmarks.

11. The method of claim 1, further including:

a step of building the first agency cost estimation model using historical transaction data for all executions, including trade data for trade executions for which traders can postpone or abandon trading to take advantage of market conditions; and a step of building the second agency cost estimation model using historical transaction data for executions only for trades for which traders do not have discretion and must execute regardless of whether market conditions are favorable, and excluding data for opportunistic trade executions.

12. A nontransitory computer program product including computer executable instructions stored on a computer readable medium, for estimating transaction costs of a security trade execution according to a trading strategy selected by a user, by execution of operations comprising the steps of:

receiving over a network, data defining parameters of a proposed trade execution from a user, and data specifying a user-selected trading strategy, said trading strategy data including a sequence of share quantities of securities to be traded per time interval for a given trading horizon;

calculating first estimated transaction costs for the received proposed trade execution based on the user-selected trading strategy and market data using a first agency cost estimation model that considers discretionary and non-discretionary trades;

calculating second estimated transaction costs for the received proposed trade execution based on the user-selected trading strategy and market data using a second agency cost estimation model that considers only non-discretionary trades; and displaying to the user at least one of the first and second estimated transaction costs;

wherein, said user-selected trading strategy is selected from among a plurality of predefined trading styles, or specifically defined by said user.

13. The computer program product of claim 12, wherein operations further comprises steps for generating recommendations for optimizing the user-selected trading strategy based on at least one of the first and second estimated transaction costs and providing said recommendations to the user over the network.

14. The computer program product of claim 12, wherein an adjustment factor adjusts for trade difficulty and market conditions to allow for an accurate comparison of trades performed under different circumstances and trading conditions.

15. The computer program product of claim 14, wherein said adjustment factor provides an expected trading cost for each security for each day based on a statistical analysis of measures of trade difficulty.

16. The computer program product of claim 12, further comprising operations for performing a step of receiving a risk aversion profile and hypothetical trade order characteristics through the network and wherein said step of calculating second estimated transaction costs factors said risk aversion profile and hypothetical trade order characteristics.

17. The computer program product of claim 12, comprising operations for performing the further step of:

providing a user interface to allow a user to identify relevant data and trends in a dataset, and to locate factors that affect transaction performance.

18. The computer program product of claim 17, wherein a user is able to change a subset of the dataset under consideration and perform real-time analytic calculations without additional pre-processing.

19. The computer program product of claim 17, wherein a user may add new user aggregates, without additional pre-processing.

20. The computer program product of claim 12, wherein a direct interface is provided to a securities price database to enable the display of transaction cost analysis results in real-time.

21. The computer program product of claim 12, wherein a transaction cost algorithm allows for intra-day calculation of price-based benchmarks.

22. The computer program product of claim 12, further including operations for performing:

a step of building the first agency cost estimation model using historical transaction data for all executions, including trade data for trade executions for which traders can postpone or abandon trading to take advantage of market conditions; and a step of building the second agency cost estimation model using historical transaction data for executions only for trades for which that traders do not have discretion and must execute regardless of whether market conditions are favorable, and excluding data for opportunistic trade executions.

23. A system for estimating transaction costs of a security trade execution according to a trading strategy selected by a user, comprising:

means for receiving over a network, data defining parameters of a proposed trade execution from a user, and data specifying a user-selected trading strategy, said trading strategy data including a sequence of share quantities of securities to be traded per time interval for a given trading horizon;

means for calculating first estimated transaction costs for the received proposed trade execution based on the user-selected trading strategy and market data using a first agency cost estimation model that considers discretionary and non-discretionary trades;

means for calculating second estimated transaction costs for the received proposed trade execution based on the user-selected trading strategy and market data using a second agency cost estimation model that considers only non-discretionary trades; and means for displaying to the user at least one of the first and second estimated transaction costs;

wherein, said user-selected trading strategy is selected from among a plurality of predefined trading styles, or specifically defined by said user.

24. The system of claim 23, wherein the system further comprises means for generating recommendations for optimizing the user-selected trading strategy based on at least one of the first and second estimated transaction costs and providing said recommendations to the user over the network.

25. The system of claim 23, wherein an adjustment factor adjusts for trade difficulty and market conditions to allow for an accurate comparison of trades performed under different circumstances and trading conditions.

26. The system of claim 25, wherein said adjustment factor provides an expected trading cost for each security for each day based on a statistical analysis of measures of trade difficulty.

27. The system of claim 24, further comprising means for receiving a risk aversion profile and hypothetical trade order characteristics through the network and wherein said means for calculating second estimated transaction costs factors said risk aversion profile and hypothetical trade order characteristics.

28. The system of claim 23, further comprising means for providing a user interface to allow a user to identify relevant data and trends in a dataset, and to locate factors that affect transaction performance.

29. The system of claim 28, wherein a user is able to change a subset of the dataset under consideration and perform real-time analytic calculations without additional pre-processing.

30. The system of claim 28, wherein a user may add new user aggregates, without additional pre-processing.

31. The system of claim 23, further comprising a server adapted to provide a direct interface to a securities price database to enable the display of transaction cost analysis results in real-time.

32. The system of claim 23, wherein a transaction cost algorithm allows for intra-day calculation of price-based benchmarks.

33. The system of claim 23, further comprising:

means for building the first agency cost estimation model using historical transaction data for all executions, including trade data for trade executions for which traders can postpone or abandon trading to take advantage of market conditions; and means for building the second agency cost estimation model using historical transaction data for executions only for trades for which that traders do not have discretion and must execute regardless of whether market conditions are favorable, and excluding data for opportunistic trade executions.

34. A system for estimating transaction costs of a security trade execution according to a trading strategy selected by a user, comprising:

a server coupled with an electronic data network configured to receive over a network, data defining parameters of a proposed trade execution from a user, and data specifying a user-selected trading strategy, said trading strategy data including a sequence of share quantities of securities to be traded per time interval for a given trading horizon, calculate first estimated transaction costs for the received proposed trade execution based on the user-selected trading strategy and market data using a first agency cost estimation model that considers discretionary and non-discretionary trades, calculate second estimated transaction costs for the received proposed trade execution based on the user-selected trading strategy and market data using a second agency cost estimation model that considers only non-discretionary trades, and transmit, for display, the first and second estimated transaction costs to a user via the electronic data network;

wherein, said user-selected trading strategy is selected from among a plurality of predefined trading styles, or specifically defined by said user.

35. The system of claim 34, wherein the system further comprises means for generating recommendations for optimizing the user-selected trading strategy based on at least one of the first and second estimated transaction costs and providing said recommendations to the user over the network.

36. The system of claim 34, wherein said server is further configured to build the first agency cost estimation model using historical transaction data for all executions, including trade data for trade executions for which traders can postpone or abandon trading to take advantage of market conditions, and to build the second agency cost estimation model using historical transaction data for executions only for trades for which that traders do not have discretion and must execute regardless of whether market conditions are favorable, and excluding data for opportunistic trade executions.

* * * * *